United States Patent
Ferchau et al.

(10) Patent No.: US 11,801,769 B1
(45) Date of Patent: Oct. 31, 2023

(54) SPECIAL PURPOSE ELECTRIC VEHICLES AND LOAD MANAGEMENT SYSTEMS AND METHODS THEREFOR

(71) Applicant: First Priority Group, LLC, Flanders, NJ (US)

(72) Inventors: Joerg U. Ferchau, Morgan Hill, CA (US); Michael T. McSweeney, Newton, NJ (US)

(73) Assignee: First Priority Group, LLC, Flanders, NJ (US)

( * ) Notice: Subject to any disclaimer, the term of this patent is extended or adjusted under 35 U.S.C. 154(b) by 0 days.

(21) Appl. No.: 17/873,946

(22) Filed: Jul. 26, 2022

Related U.S. Application Data

(60) Provisional application No. 63/225,917, filed on Jul. 26, 2021.

(51) Int. Cl.
*B60L 58/18* (2019.01)
*H02J 7/00* (2006.01)
(Continued)

(52) U.S. Cl.
CPC .............. *B60L 58/18* (2019.02); *B60L 1/003* (2013.01); *B60L 1/14* (2013.01); *B60L 50/60* (2019.02); *B60L 58/12* (2019.02); *H01M 10/425* (2013.01); *H01M 10/441* (2013.01); *H01M 10/482* (2013.01); *H01M 10/486* (2013.01); *H02J 7/007* (2013.01); *H02J 7/0013* (2013.01); *H02J 7/00032* (2020.01); *H02J 7/0048* (2020.01); *H02J 7/0063* (2013.01); *H01M 2010/4271* (2013.01); *H01M 2010/4278* (2013.01); *H01M 2220/20* (2013.01)

(58) Field of Classification Search
CPC ............ B60L 58/18; B60L 1/003; B60L 1/14; B60L 50/60; B60L 58/12; H01M 10/425; H01M 10/441; H01M 10/482; H01M 10/486; H01M 2010/4271; H01M 2010/4278; H01M 2220/20; H02J 7/00032; H02J 7/0013; H02J 7/0048; H02J 7/0063; H02J 7/007
USPC ........................................................ 307/139
See application file for complete search history.

(56) References Cited

U.S. PATENT DOCUMENTS

| | | |
|---|---|---|
| 8,534,400 B2 | 9/2013 | Stanek et al. |
| 9,908,420 B2 | 3/2018 | Lee et al. |

(Continued)

OTHER PUBLICATIONS

Kumar, Vivek et al.; Intelligent Auxiliary Battery Control—A Connected Approach; Sep. 21, 2021; SAE International; pp. 1-9; SAE Technical Paper; 2021-01-1248; ISSN 0148-7191.

*Primary Examiner* — Rexford N Barnie
*Assistant Examiner* — Swarna N Chowdhuri
(74) *Attorney, Agent, or Firm* — Downs Rachlin Martin PLLC

(57) ABSTRACT

Special purpose power systems for electric vehicles, control methods and special purpose electric vehicles are disclosed. Special purpose power systems control and manage loads in special purpose devices used in special purpose vehicles such as first responder vehicles. Disclosed systems and methods offer systematic control load shedding according to user designated load circuit priorities to maintain special purpose system capabilities without degrading the electric vehicle traction system and provide control of multiple circuit connections for redundant, fault tolerant operations.

19 Claims, 10 Drawing Sheets

(51) Int. Cl.
*B60L 50/60* (2019.01)
*B60L 58/12* (2019.01)
*B60L 1/00* (2006.01)
*B60L 1/14* (2006.01)
*H01M 10/44* (2006.01)
*H01M 10/48* (2006.01)
*H01M 10/42* (2006.01)

(56) References Cited

U.S. PATENT DOCUMENTS

| | | | |
|---|---|---|---|
| 2011/0168462 A1* | 7/2011 | Stanek | B60L 53/14 |
| | | | 320/109 |
| 2016/0159220 A1* | 6/2016 | Enomoto | B60L 1/006 |
| | | | 701/22 |
| 2017/0080809 A1 | 3/2017 | Lee et al. | |
| 2022/0001769 A1 | 1/2022 | Huh | |
| 2022/0024323 A1* | 1/2022 | Kresse, III | B60W 10/04 |

* cited by examiner

SPECIAL PURPOSE ELECTRIC VEHICLES AND LOAD MANAGEMENT SYSTEMS AND METHODS THEREFOR

RELATED APPLICATIONS

The present application claims priority to U.S. Provisional Application No. 63/225,917, filed Jul. 26, 2021, entitled "First Responder All-Electric Vehicles and Systems and Methods for Auxiliary Power System Management Therein," which is incorporated by reference herein in its entirety.

FIELD

The present disclosure generally relates to the field of electric vehicle (EV) systems and related battery management systems, and more specifically to special purpose electric vehicles and load management systems and methods therefor.

BACKGROUND

Special purpose vehicles such as first responder vehicles utilize powered systems for completion of specific tasks in addition to conventional functions of vehicles with respect to transport and passenger comfort and convenience. For example, first responder vehicles, such as those used in police, fire department, ambulance, or military applications, utilize a variety of different specialized systems adapted to their unique missions and operating environments. Such specialized systems may include systems and devices such as scene lighting, pumps, public address systems, communications and command center systems, heating/cooling, computing systems and displays, etc. These specialized systems typically require electric energy to operate, and typically draw that energy from onboard vehicle sources such as batteries or from energy supplied from alternators or generators powered by primary or secondary internal combustion engines. The energy requirements of such specialized systems are also typically far greater than can be provided by conventional vehicle auxiliary power systems based on low voltage batteries that power components such as starter motors, wipers, dash lights and basic vehicle lights such as headlights and tail lights.

Concurrent with the worldwide adoption of electric vehicles (EVs), first responder, emergency services and other special purpose vehicle fleets are beginning to implement fully electric powered versions of those too. These vehicles use energy for traction power that is stored in large onboard batteries. The vehicle's achievable electric driving range is a function of the energy stored in those traction batteries and is affected by many factors including: battery size and energy storage capacity, driving style, vehicle duty cycle, battery age and health, vehicle weight, vehicle aerodynamics, environmental factors such as temperature, and many other factors.

Because first responder vehicles and other special purpose vehicles require energy to power specialized devices, they may need to draw that energy from the vehicle itself. This is especially true when vehicles are deployed for long periods of time or when other onboard energy storage options are depleted. The problem with drawing energy from the vehicle is that it can reduce the amount of energy that is stored in the onboard traction battery system and therefore reduces the vehicle's remaining driving range. That in turn can create a situation where vehicles are unable to complete their missions or do not have sufficient onboard energy to drive to their desired destination.

Battery systems that are commonly used to power specialized systems in many first responder vehicles or other special purpose vehicles often depend on energy received from an internal combustion engine-powered alternator or generator to remain energized—which is not available on an electric vehicle. Also, if the electric vehicle has a battery system to power specialized systems, and there is a failure with that specialized device battery system, the vehicle may not be able to power its specialized systems since no engine-based energy is available for backup as in conventional vehicles. As a second concern, if certain components or connections in the power distribution circuit fail, the vehicle's specialized systems may become inoperable.

Existing EV load management systems, such as those disclosed, for example, in U.S. Pat. No. 8,534,400, entitled "Electric Vehicle and Method of Control for Active Auxiliary Battery Depletion," and U.S. Pat. No. 9,908,420, entitled "Charging Control Method and System for Electric Vehicle," may provide adequate charge/discharge control and protection for conventional traction battery systems and low voltage auxiliary battery systems in current EVs, but such systems are insufficiently robust and flexible for power management of systems of special purpose devices. Also such conventional systems do not provide adequate fault protection for critical system in special purpose vehicles such as first responder vehicles. There are further advantages in some situations to maintaining power management for systems of special purpose devices as separate from the traction system, even when a connection is provided for cross-system power draw.

First responder and other special purpose electric vehicles thus require specialized systems onboard energy storage that is scalable, resilient, and flexible in operation and in recharging in order to assure that the vehicle can complete its mission and to ensure that the vehicle's available driving range is not reduced when the specialized onboard systems are in operation. Additionally, the vehicle's specialized systems can be made to be more resilient against failures with an improved architecture and configurability.

Furthermore, when onboard and auxiliary power is limited due to battery energy becoming depleted, in many cases it is advantageous for the system to be able to automatically prioritize which devices draw power and which devices should be powered off in order to extend the operation of those devices with a reduction in available onboard energy.

SUMMARY

In one implementation, the present disclosure is directed to a special purpose (SP) power system for an electric vehicle (EV) having a traction battery, at least one traction motor powered by the traction battery, a low voltage auxiliary battery powering EV auxiliary devices and an EV controller configured to control power, charge and discharge of the traction battery and low voltage auxiliary battery. The special purpose (SP) power system, includes plural SP AC load circuits, each AC load circuit containing at least one AC powered SP device; plural SP DC load circuits, each DC load circuit containing at least one DC powered SP device; an SP system battery configured to deliver power to the SP load circuits; a power connection between the traction battery and SP battery; an SP control system configured to at least monitor SP system battery state parameters including current charge level, capacity, temperature, current and charge/discharge state and determine SP system battery state of charge (SOCSP) based on one or more the state parameters; and a data link between traction control system and SP control system configured to at least communicate traction system state of charge information to the SP control system; wherein the SP control system comprises one or more processors, non-transitory storage devices, user interfaces, and stored instructions that when executed by the one or more processors cause the SP control system to—control power delivered to the plural AC and DC load circuits from the SP system battery; manage charge and discharge of the SP system battery; and control power draw from the traction battery to SP power system based on criteria set in the SP control system.

In another implementation, the present disclosure is directed to a special purpose electric vehicle (SPEV), that includes a traction system, comprising—a traction battery; at least one traction motor powered primarily by the traction battery to provide propulsion for the vehicle; an auxiliary battery; auxiliary devices powered primarily by the auxiliary battery; a traction control system configured to at least (i) control power delivered to the traction motor from the traction battery, (ii) control power delivered to auxiliary devices by the auxiliary battery, and (iii) manage charge and discharge of the traction and auxiliary batteries; and a special purpose (SP) power system, comprising—plural SP AC load circuits, each AC load circuit containing at least one AC powered SP device; plural SP DC load circuits, each DC load circuit containing at least one DC powered SP device; an SP system battery configured to deliver power to the SP load circuits; a power connection between the traction battery and SP battery; an SP control system configured to at least (i) control power delivered to the plural AC and DC load circuits from the SP system battery, (ii) manage charge and discharge of the SP system battery, and (iii) control power draw from the traction battery to SP power system based on criteria set in the SP control system; and a data link between traction control system and SP control system configured to at least communicate traction system state of charge information to the SP control system; wherein the SP control system comprises one or more processors, non-transitory storage devices, user interfaces, and stored instructions that when executed by the one or more processors cause the SP control system to—receive user inputs comprising SP load circuit priority, desired SP system run time; set SP load circuit priority in accordance with the user input or in the absence of user input based on preset SP device information received by the one or more processors; disconnect SP load circuits from the SP system battery in accordance with the SP load circuit priority based on one or both of (i) maintaining power to highest priority SP load circuits for the desired run time, and (ii) comparison of the SP system battery state of charge (SOCSP) to an SOCSP minimum, and initiate power draw from the traction battery to the SP system battery in response to measured SP power system parameters, and terminate power draw from the traction battery based on measured traction battery state of charge.

In yet another implementation, the present disclosure is directed to a computer-implemented method of managing power to special purpose (SP) devices in an SP power system of an electric vehicle (EV), wherein the SP devices comprise AC and DC loads configured in SP AC load circuits and SP DC load circuits. The method includes monitoring battery state parameters of an SP system battery including current charge level, capacity, temperature, current and charge/discharge state; determining SP system battery state of charge (SOCSP) based on one or more of the battery state parameters; receiving user inputs comprising SP load circuit priority and desired SP system run time; setting SP load circuit priority in accordance with the user input or, in the absence of user input, based on preset SP device information stored in a memory; disconnecting SP load circuits from the SP system battery in accordance with the SP load circuit priority based on one or both of (i) maintaining power to highest priority SP load circuits for the desired run time, and (ii) comparison of the SP system battery state of charge (SOCSP) to an SOCSP minimum; initiating power draw from an EV traction battery to the SP system battery in response to measured SP power system parameters; and terminating power draw from the EV traction battery based on measured traction battery state of charge.

In still another implementation, the present disclosure is directed to a computer program product for managing power to special purpose (SP) devices in an SP power system of an electric vehicle (EV), wherein the SP devices comprise AC and DC loads configured in SP AC load circuits and SP DC load circuits. The computer program product includes a computer readable storage medium having program instructions embodied therewith, the program instructions executable by one or more processors to cause the one or more processors to perform a method comprising: monitoring battery state parameters of an SP system battery including current charge level, capacity, temperature, current and charge/discharge state; determining SP system battery state of charge (SOCSP) based on one or more of the battery state parameters; receiving user inputs comprising SP load circuit priority and desired SP system run time; setting SP load circuit priority in accordance with the user input or, in the absence of user input, based on preset SP device information stored in a memory; disconnecting SP load circuits from the SP system battery in accordance with the SP load circuit priority based on one or both of (i) maintaining power to highest priority SP load circuits for the desired run time, and (ii) comparison of the SP system battery state of charge (SOCSP) to an SOCSP minimum; initiating power draw from an EV traction battery to the SP system battery in response to measured SP power system parameters; and terminating power draw from the EV traction battery based on measured traction battery state of charge.

BRIEF DESCRIPTION OF DRAWINGS

For the purpose of illustrating the disclosure, the drawings show aspects of one or more embodiments of the disclosure. However, it should be understood that the present disclosure is not limited to the precise arrangements and instrumentalities shown in the drawings, wherein.

DETAILED DESCRIPTION

The present disclosure describes special purpose electric vehicles (SPEVs) and power management systems and methods for SPEVs using a modular approach with intelligent system and charge status monitoring in which system status and energy use (charging and depletion) are monitored and the system status and operating status are tracked and indicated and can also be externally reported via telematics systems. Modularity and intelligent monitoring as described herein provides a number of advantages over prior systems. Because the vehicles may have a varying array of specialized devices, it may be advantageous for customers to be able to determine their own specific priority for maintaining power to each of those devices. To enable that, the system is also configurable so that the devices can be connected to the circuits in the priority order that the customer desires. Intelligent monitoring and control also allows systems to alter operating modes to optimize energy management (charging and depletion, or discharging) based on the customer's application priorities.

Figure 1:
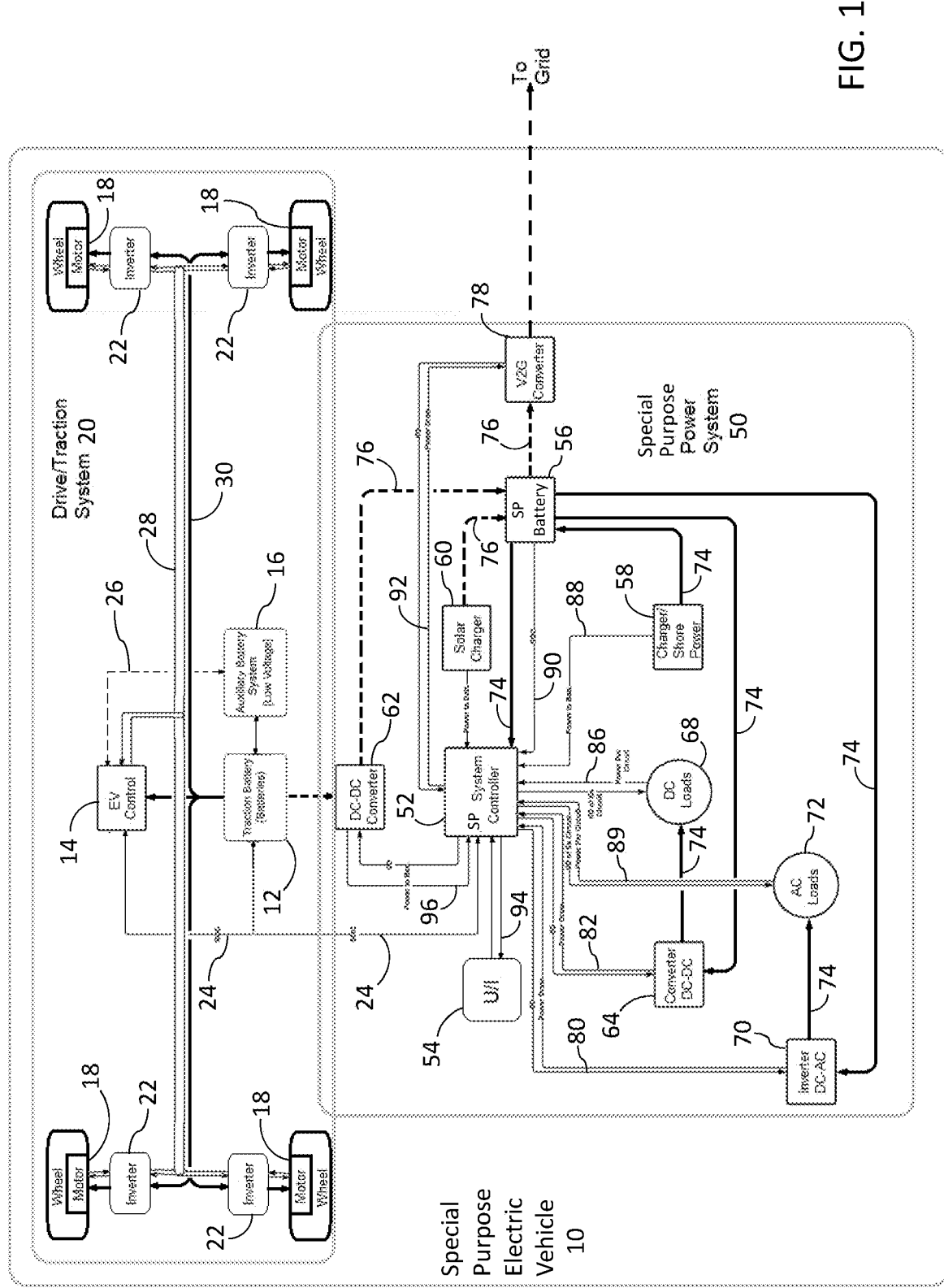
FIG. 1 is a block diagram illustrating control systems for electric vehicles ("EVs") according to the present disclosure.

One example of an SPEV according to the present disclosure is illustrated in FIG. 1. As shown therein, SPEV 10 comprises at least two primary systems, the vehicle drive/traction system 20 and the special purpose (SP) power system 50. In the illustrated example, the drive/traction system 20 is based on in-wheel motors 18, each with its own inverter 22 receiving power from vehicle traction batteries 12 and under control of the EV control unit 14. As is typical in EVs, in addition to traction batteries 12, an auxiliary battery 16, typically a low voltage battery system, is provided to operate standard auxiliary equipment such as headlights, wipers, windows and door locks, etc. Control communication is indicated by thin lines (corn links) 24, 26, 28 and power flow by thick lines (power cables) 30 in traction system 20. In particular, state of charge (SOC) information from individual battery management circuits is provided to the EV control unit for overall battery management and system optimization. Other drive systems are possible using different motor arrangements and power supplies without departing from the scope of the present disclosure. Further details of conventional EV control systems are provided, for example, in U.S. Pat. No. 8,534,400, entitled "Electric Vehicle and Method of Control for Active Auxiliary Battery Depletion", dated Sep. 17, 2013, which is incorporated by reference herein in its entirety. In general, persons of ordinary skill may configure the SPEV drive/traction system based on the teachings of the present disclosure in combination with general EV knowledge.

The SP power system 50 is built around one or more SP system controllers 52. As illustrated in FIG. 1, SP systems comprise AC loads 72 and DC loads 68. Examples of DC loads 68 in some SPEVs include emergency scene lighting and radios. Examples of AC loads 72 include special purpose air conditioning or refrigeration units and computers. DC loads 68 receive power from the SP battery via a DC-DC power converter 64, and AC loads 72 receive power from the SP battery 56 via a DC-AC inverter 70. The power draw for each converter/inverter is communicated to the SP system controller, and each load communicates its own power draw back to the controller via data links 80, 82, 86 and 89. The SP system controller 52 provides I/O commands for each such power component also via those data links. Examples of I/O commands include, for inputs, sensor data from and components status (e.g. charging status or state of charge), and, for outputs, control signals to components and circuits.

Table 1 provides an example of SP system loads in a typical SP vehicle configured as a first responder electric vehicle in accordance with the present disclosure.

TABLE 1

Power Usage Example

| | Quan. | Volt | Amp Ea | Amp Total | Watt Ea | Watt Total |
|---|---|---|---|---|---|---|
| 12 Volt DC | | | | | | |
| Perimeter Scene lights | 4 | 12 | 13 | 52 | 156 | 624 |
| LED lighting | 4 | 12 | 2.29 | 9.16 | 27.48 | 109.92 |
| Refrigerator 2.7 cu-ft | 1 | 12 | 3.7 | 3.7 | 44.4 | 44.4 |
| Radios | 0 | 12 | 2 | 0 | 24 | 0 |
| Total 12 V | | | | 64.86 | | 778.32 |
| 120 Volt AC | | | | | | |
| Laptops | 1 | 120 | 3.33 | 3.33 | 399.6 | 399.6 |
| Monitors | 2 | 120 | — | 2.5 | 150 | 300 |
| Server 900 w Pwr Supply | 0 | 120 | 7.5 | 0 | 900 | 0 |
| Air Cond.13,500 BTU | 1 | 120 | 15 | 15 | 1800 | 1800 |
| 40" TV LED | 1 | 120 | — | 0.833333333 | 100 | 100 |
| Total 120 V | | | | 21.66333333 | | 2599.6 |

TABLE 1-continued

| Power Usage Example | | | |
|---|---|---|---|
| Inverter efficiency factor = 91% (85<e>95%) | | 0.91 | 0.91 |
| Power used by inverter | | | 2856.703297 |
| | Watt Total | Run Hours | KWH |
| Total 12 V DC usage | 3635.023297 | 4 | 14.54009 |

The SP battery 56 may be charged in a number of ways. Primarily it will be charged via a standard EV shore power/charger 58, which reports charging status to the SP system controller 52 via data link 88. Alternatively, a solar charger 60, or other augmented charging system, may be provided, which will also report power to the SP battery 56 back to the SP system controller 52. In extreme use situations under certain limited conditions as discussed in more detail below, power to charge SP battery 56 may optionally be drawn from the vehicle traction batteries 12 via a dedicated DC-DC power converter 62 and power connection 76 under control of the SP system controller 52. It is also to be noted that while "battery" used in its singular form herein for the sake of brevity and clarity, "battery" refers to known portable energy storage systems, which may include single or multiple cells with or without embedded battery management controllers as is understood by persons of ordinary skill in the art.

Figure 1A:
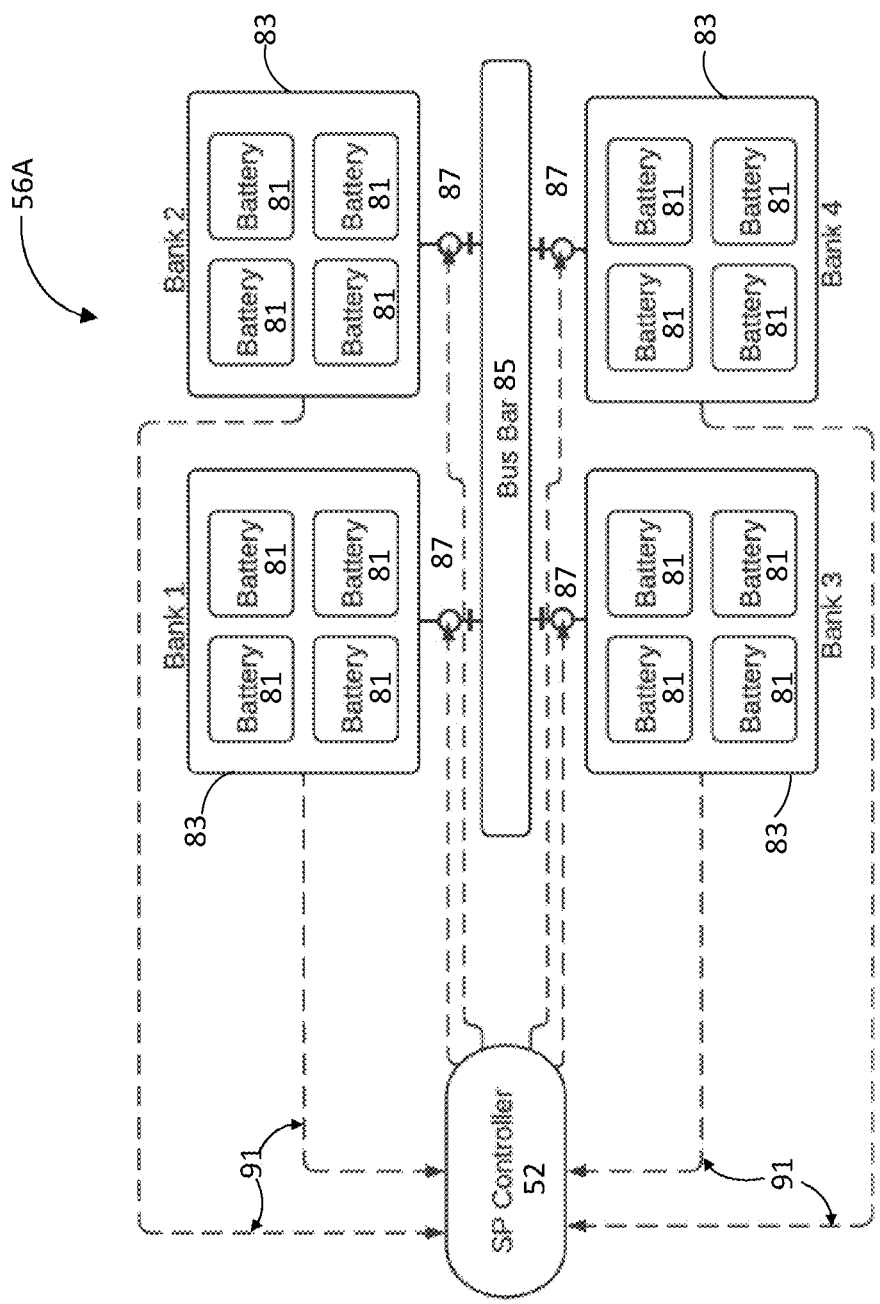
FIG. 1A is a block diagram illustrating an example of a special purpose power system battery according to embodiments disclosed herein.

One example of an SP battery 56 is illustrated in FIG. 1A. As shown therein, SP battery 56 comprises a sixteen-battery system 56A. In this example, sixteen 12V batteries 81 are wired in parallel/series to make four 24V banks 83 with double the capacity. Four of four-battery banks 83 are wired into a bus bar 85 to make one 24V battery system. Connections to bus bar 85 can be via a high current solenoid (relay) 87. Each battery bank 83 includes an integrated battery management system (BMS) to monitor state of charge and battery health. Included either as part of the BMS or separately integrated into each bank 83 are voltage, temperature and current sensors to monitor each bank 83 and report to the integrated BMS. Data links 91 from each battery bank BMS communicate battery state, temperature, current and voltage to SP system controller 52. Inputs from the integrated battery bank BMSs are used in SP system controller 52 in tandem with the integrated BMS to perform conventional battery management functions as well as inputs to control logics described hereinbelow (see, e.g., FIGS. 4-7).

One function of SP system controller 52 is to determine overall battery SOC and battery capacity. For example, if one battery bank 83 is reporting a drastically different voltage, temperature or current disconnection of that bank via high current solenoid may be determined to be appropriate. In such a case, SP system controller 52 would adjust the battery capacity of the system by 25% downward for use in determination of SOC. Controller 52 may determine SOC in a number of different ways. For example, SOC can be determined by monitoring power flow and comparing it to theoretical battery capacity or by comparing voltage to a battery manufacturer supplied voltage/SOC curve stored in memory. Thus, with information on SOC and the number of batteries that are online/connected, controller 52 can estimate how much energy capacity is still available. In one implementation, a user may be prompted to input or will input via U/I 54 theoretical or maximum capacity of each battery bank 83 and SP system controller 52 will determine SOC and energy capacity. If, as in the example above, one of the banks 83 is determined to be faulty and disconnected, controller 52 will automatically adjust the capacity for SOC determination moving forward and take into account the diminished capacity in run time determinations and future SOC predictions as further described below.

An SP system U/I 54 allows for user interaction with SP power system 50, for example to provide system status reports and allow user to set certain use parameters such as required vehicle range and/or length of use or length of shift ("run time"). In another aspect of the disclosed systems, a vehicle to grid power converter 78, communicating with SP system controller 52 via data links 92, may be used to supply power into a local power grid system or other external system requiring power.

Figure 2:
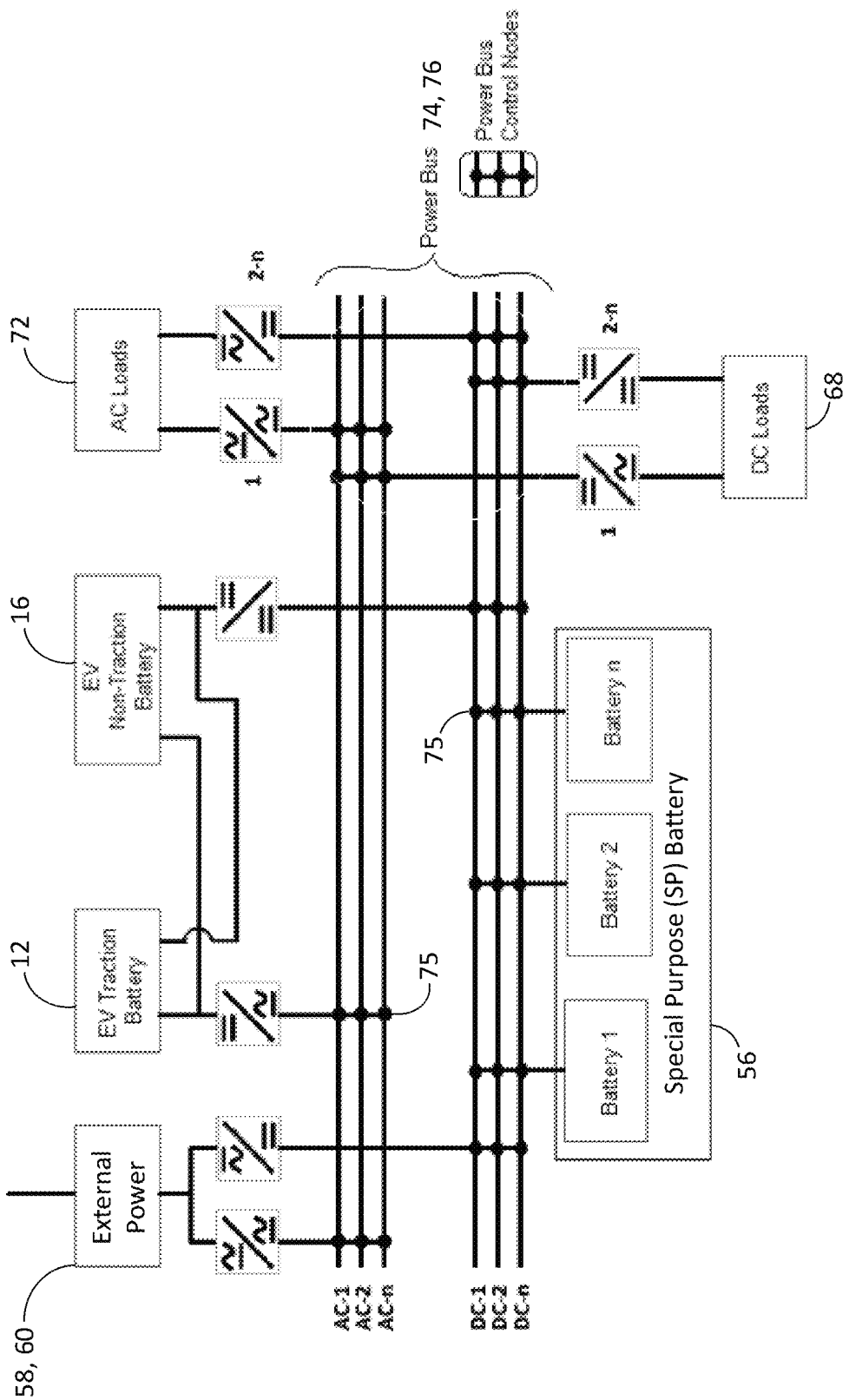
FIG. 2 is a system power circuit schematic plan for one embodiment of the present disclosure.
Figure 2A:
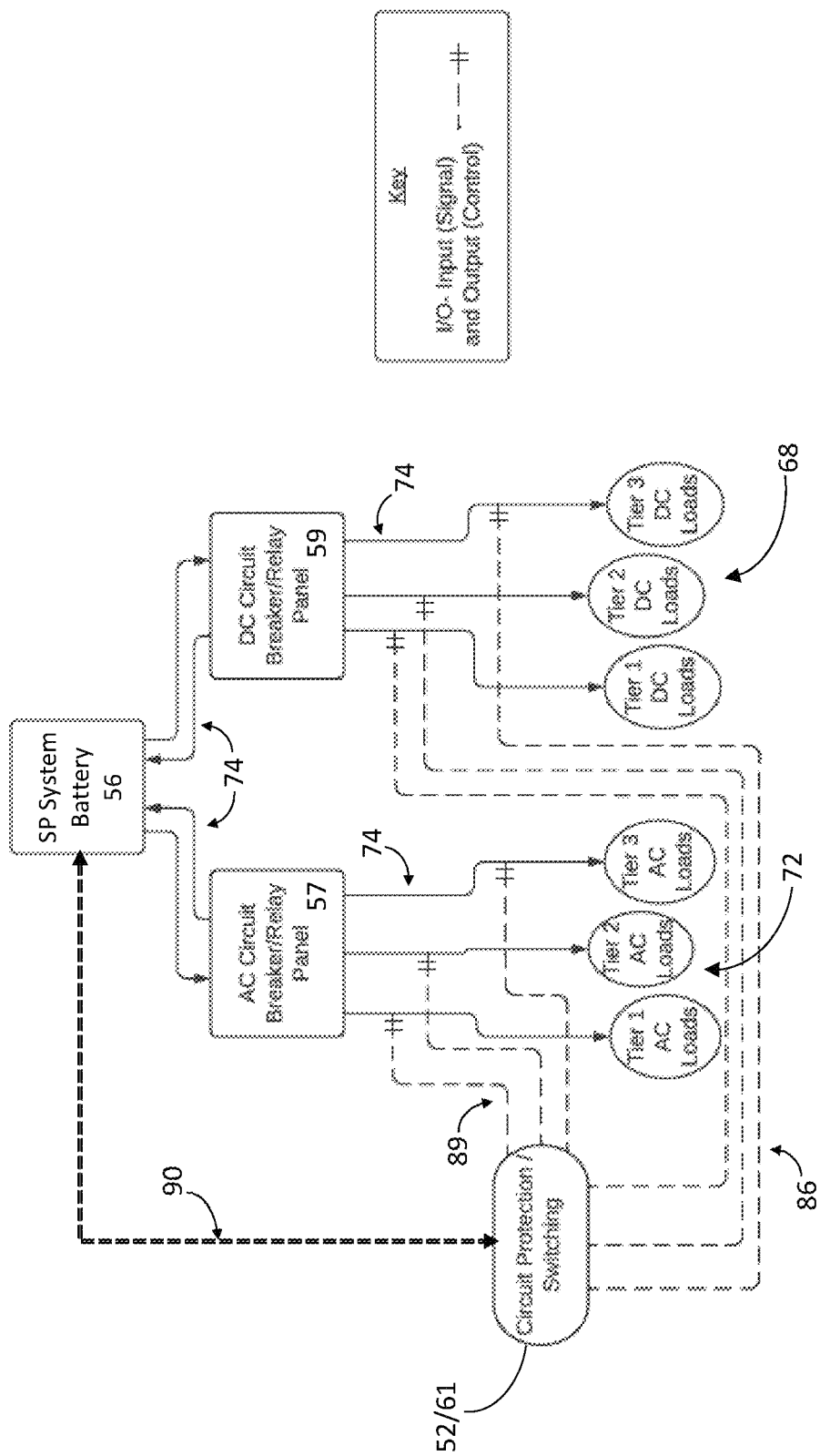
FIG. 2A is a block diagram illustrating one example of an implementation of power bus node control as shown in FIG. 2.

In a further aspect of the present disclosure, embodiments of SP power system 50 provide power bus node control. FIG. 2 schematically illustrates an example of a fault tolerant/redundant power circuit plan with power bus node control according to embodiments of the present disclosure. As shown therein, system power inputs and loads are all connected to multiple DC and AC circuits (AC-1, 2, n and DC-1, 2, n) via power bus control nodes 75. The control nodes each provide circuit protection and on/off switching under control of SP system controller 52 to allow selective circuit switching for fault tolerant redundant system design. FIG. 2A illustrates, how, in one embodiment, SP battery power is distributed to breakers and then to the loads, and how SP system controller 52 will physically switch the circuits in each designated load Tier. As shown therein, any number of AC loads 72 and DC loads 68 may be grouped individually or in circuits into priority Tiers as discussed further below. AC Breaker/Relay panel 57 and DC Breaker/Relay panel 59 each comprise plural individual circuit breakers for each load or circuit, operated under control of circuit protection/switching logic 61, which may be integrated into SP system controller 52 or executed in a separate control module. Power connections 74 and data/com links 86, 89, 90, 94 and 96 are provided as discussed above.

Thus, in embodiments disclosed herein, using 2-to-n number of batteries or independent cells 56, SP power system 50 provides power for special purpose devices without drawing from the vehicle's traction battery system (initial condition). One battery may be used in a simplex (non-fault tolerant) version, while two or more batteries provide more energy, and is also architected so that if one or more batteries fail, the remaining battery(s) is/are still able to power SP power system 50. Up to n batteries or independent cells can be added to SP system battery 56 to increase the available energy in proportion to the SP power system power draw requirements and/or in proportion to the expected time of operation.

In various embodiments, batteries can be charged via plug-in shore power connections or other on-board or external charging sources at any time, and/or batteries can be charged via shore power while simultaneously providing power to auxiliary devices. Batteries can provide power to devices when no shore power is present. When no shore power is available and batteries become nearly depleted, they can optionally draw power from the vehicle's traction battery (last resort) or can draw power from an alternator or generator powered by an internal combustion engine if one is present (either conventionally powered vehicle or external generator).

In some embodiments, SP system controller 52 can automatically or at user selectable options switch charging of the SP battery 56 from shore power 58 (or other charging system, e.g. solar 60) to the vehicle's traction battery 12 if the SP battery 56 is low on energy and shore power becomes unavailable. Such switching can also be accomplished via remote control if desired and/or the vehicle can send a signal asking for permission to switch over to charging from the traction battery prior to commencing due to potential impact on vehicle driving range.

Where the SP battery 56 is configured with multiple batteries or battery cells 1 through n, as in FIG. 2, each battery or battery cell can provide power to the devices via 1-to-n parallel electrical connections (hardwire or bus) so that if one connection or circuit line fails or is broken, power to the SP system can still be distributed through one or more of the remaining connections or components. Total SP battery capacity is scalable based on operating requirements including power draw, time in operation and/or environmental circumstances (i.e., cold weather, etc.). In some embodiments, the SP power system 50 has 1-to-n AC power and 1-to-n DC power buses for system resilience and power distribution to eliminate single points of failure. 1-to-n AC rectifiers and 1-to-n DC to DC converters may be connected to one or more power buses to provide power for all SP devices. Rectifiers, converters, power buses, and devices are arranged in numbers and are connected to provide the desired level of system resilience and fault tolerance. In this manner the SP power system 50 is designed and arranged to eliminate single points of failure.

SP power system monitoring and control logic is provided via onboard sensors (not shown), such as thermal, current and voltage sensors, and ECU hardware as described herein. One or more SP system controllers 52 function to monitor system health and operating status and provide computer-based instructions to components and circuits to ensure optimal operation. Controller(s) 52 can also interface with telematics systems and remote monitoring systems to generate and report system status. Interface may be with overall vehicle telematics, or a separate auxiliary power system telematics may be provided. Status is also displayed on vehicle-based status indicators and/or via the SP power system U/I 54. Status is communicated externally via wireless communications to remote systems or monitors.

In general, as SP system battery energy becomes depleted, the SP system controller 52 will cease powering the lowest priority devices in a pre-determined or configurable order, reserving power for the most critical operations as long as possible. This may be automatic based on predefined parameters or the SP system may be configured to be required to first request permission to depower certain components prior to doing so if desired as a control method.

In one configuration, SP system controller 52 can request permission to draw power from the vehicle traction systems prior to doing so if desired as a control method. SP system control can be done on the SP control panel (U/I) 54 or remotely via smart phone or computer dashboard system. System status including battery state of charge (SOC), rate of energy use, historical energy use, etc., can be measured and presented on the vehicle or externally via wireless means. External communications with the SP power system that affect control or that acquire status are via secure and authenticated means.

The SP power system 50 may be configured also to accept shore power as AC level 1, 2 or 3 (level is an option) and also DC power (standard or fast charge). The SP power system may also receive power from non-grid power sources such as onboard solar panels 60. In a further alternative, the SP power system can also incorporate a two-way charger that allows the vehicle to accept a charge or under control to export power (commonly referred to as vehicle to grid (V2G) or vehicle to X (V2X)). In some embodiments the SP system controller 52 incorporates algorithms to determine whether the vehicle can or should export power and from what battery system (traction or SP or both).

Figure 3:
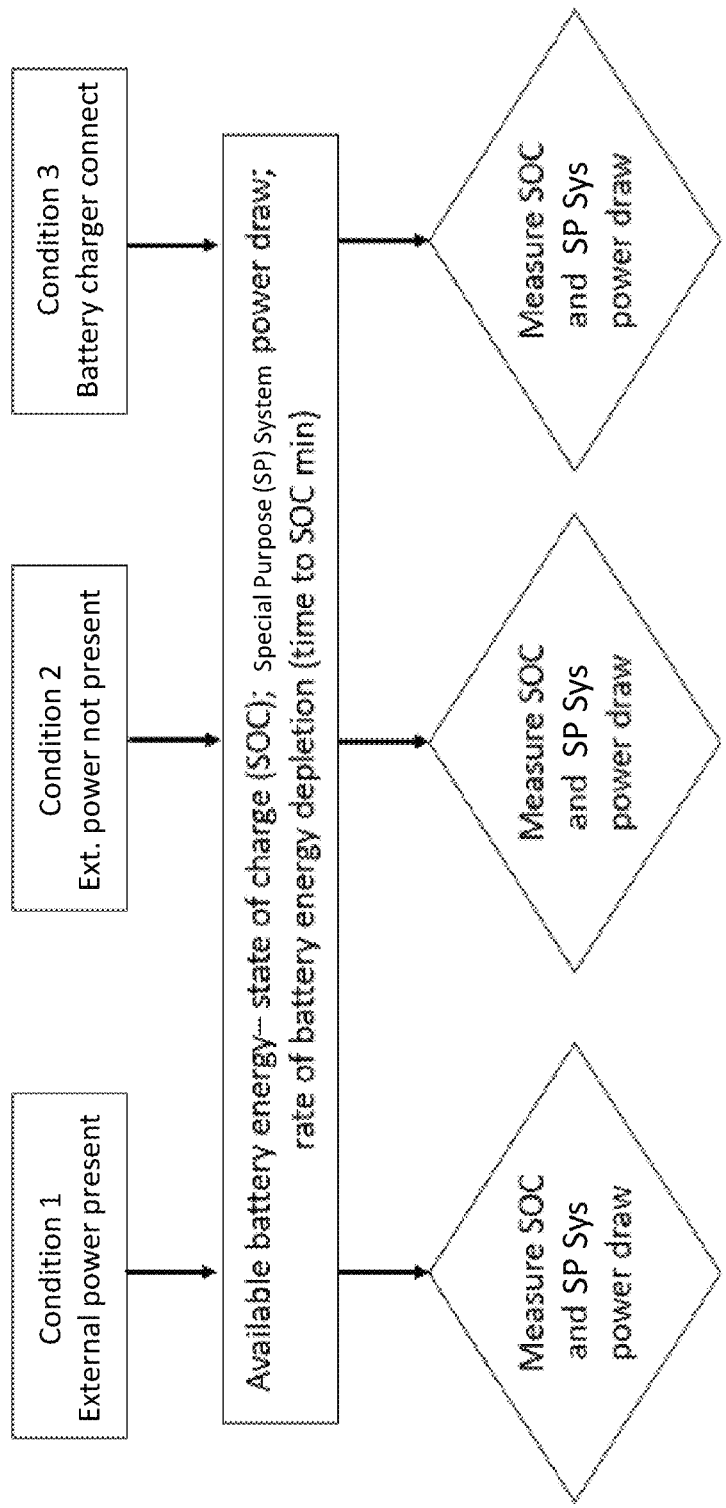
FIG. 3 is a block diagram illustrating a high-level decision logic according to embodiments of the present disclosure.

Aspects of control logic executed in the auxiliary power system controller according to disclosed embodiments is described in connection with FIGS. 3-7. For vehicle power export applications, the SOC of the onboard battery systems would first be measured. If power export is enabled, it will cease if onboard battery energy is reduced to a certain value. The SPEV should always draw on external power sources for charging batteries as the priority over using remaining onboard energy. If the SPEV is connected to shore power (external power) and the shore power drops out, the vehicle will automatically behave as though no external power is available. If shore power is re-established, the vehicle will revert to using that as the priority. These three general power states are represented in FIG. 3 as power conditions 1 through 3. However, as will be appreciated by persons skilled in the art, in many circumstances the control algorithms employed in Conditions 1 and 3 may be effectively the same or highly similar such that power systems and battery management for the SP power system may in most circumstances comprise two different power conditions.

As shown in FIG. 3, external power can be any of shore power, solar, generator, or etc. The battery charger can be level 1, 2, or 3 AC charger or DC direct charger as defined in the art. SP system power draw is a real-time measurement of energy usage or can be a calculated value based on historical system performance or data. The SP battery state of charge ($SOC_{SP}$) can be 0% to 100% of SP battery capacity, however, in practical application the actual state of charge for the SP battery never reaches absolute 0% due to internal controls set by the integrated battery management system as is conventional in state of the art secondary battery cells to protect the cells from charging or discharging too quickly or discharging too deeply in a manner that would damage battery capacity or performance. Thus, references hereinafter to the SP battery or $SOC_{SP}$ being depleted or at zero refer to power useable by the SP (or EV) system, not absolute capacity or state of charge.

FIG. 4-7 illustrates more details of examples of segments of a decision logic for an SPEV according to embodiments disclosed herein. These segments include charge and mode selection logic 100 shown in FIG. 4, preset limit control mode 120 shown in FIG. 5, user selected run time control mode 116 shown in FIG. 6, steady state control scheme 122 shown in FIG. 7, and hybrid control mode 118. Together, control logic segments 100, 116, 118, 120 and 122 form a complete, integrated control logic scheme for an SPEV. However, as will be appreciated by persons skilled in the art, each of these control logic segments need not be utilized with all others and may be used individually or with other segments combined with other different control logic segments devised by persons of skill in the art based on the teachings of the present disclosure, or in some instances with other pre-existing control logic segments. In addition to user-settable parameters, SP system controller 52 may use measured parameters such as battery temperature, current and charge levels.

Embodiments of control logic disclosed herein rely on tiering of SP loads in order to facilitate automated load shedding functions. It is anticipated that at least three tiers would be defined in order to provide sufficient levels of control over power usage. Persons skilled in the art may decide however to define fewer or more tiers without departing from the teachings of the present disclosure. As one, non-limiting example, in a three-tier embodiment, one definition set for the tiers, in reverse order of priority, may be as follows:

Tier 3: Least important devices/circuits. Tier 3 will circuit(s) comprise all non-essential loads. Examples include things like accessory outlets for items such as cell phone chargers, auxiliary monitors, etc. Tier 3 circuits will be the first circuits to be turned off if the current $SOC_{SP}$ and current load/draw determinations in SP system controller 52 project a run time shorter than the user input time, or if $SOC_{SP}$ is below a presently set threshold.

Tier 2: This will be a next priority of circuits. Tier 2 will include items like Climate/HVAC, laptop chargers, and hot water heaters, etc. This will be the second circuit set to be turned off.

Tier 1: This will be for mission critical components such as radios, lighting, security systems etc. Typically this circuit set will never be shut down by an automated system as long as there is sufficient capacity available under various power scenarios to maintain it.

In some embodiments, a user may assign specific loads to specific circuit tiers based on user preference in a particular special purpose application. Additionally, or alternatively, specific loads may be pre-assigned to a tier by the SP controller 52 when added to the system based on unique addressing for the component and information on components and tiers stored in memory. Pre-assigned tiers may also optionally be alterable by the user via the U/I 54.

The following descriptions identify a number of user selectable inputs such as, for example, Run Time X, Control Mode selection, User Selected Tier # and pre-set SOC percentages and $SOC_{SP-MIN}$ times. The position of any such user input in the process flow descriptions that follow is not intended to and does not suggest that the described position is the only position in the process flow at which point such user inputs may be made or altered. User inputs are mentioned in the process flow descriptions at particular points only for the sake of clarity in the description. Persons of skill in the art will appreciate that such user inputs may be made or altered at many other points in a process flow, singly or in groups, without departing from the teachings of the present disclosure.

Figure 4:
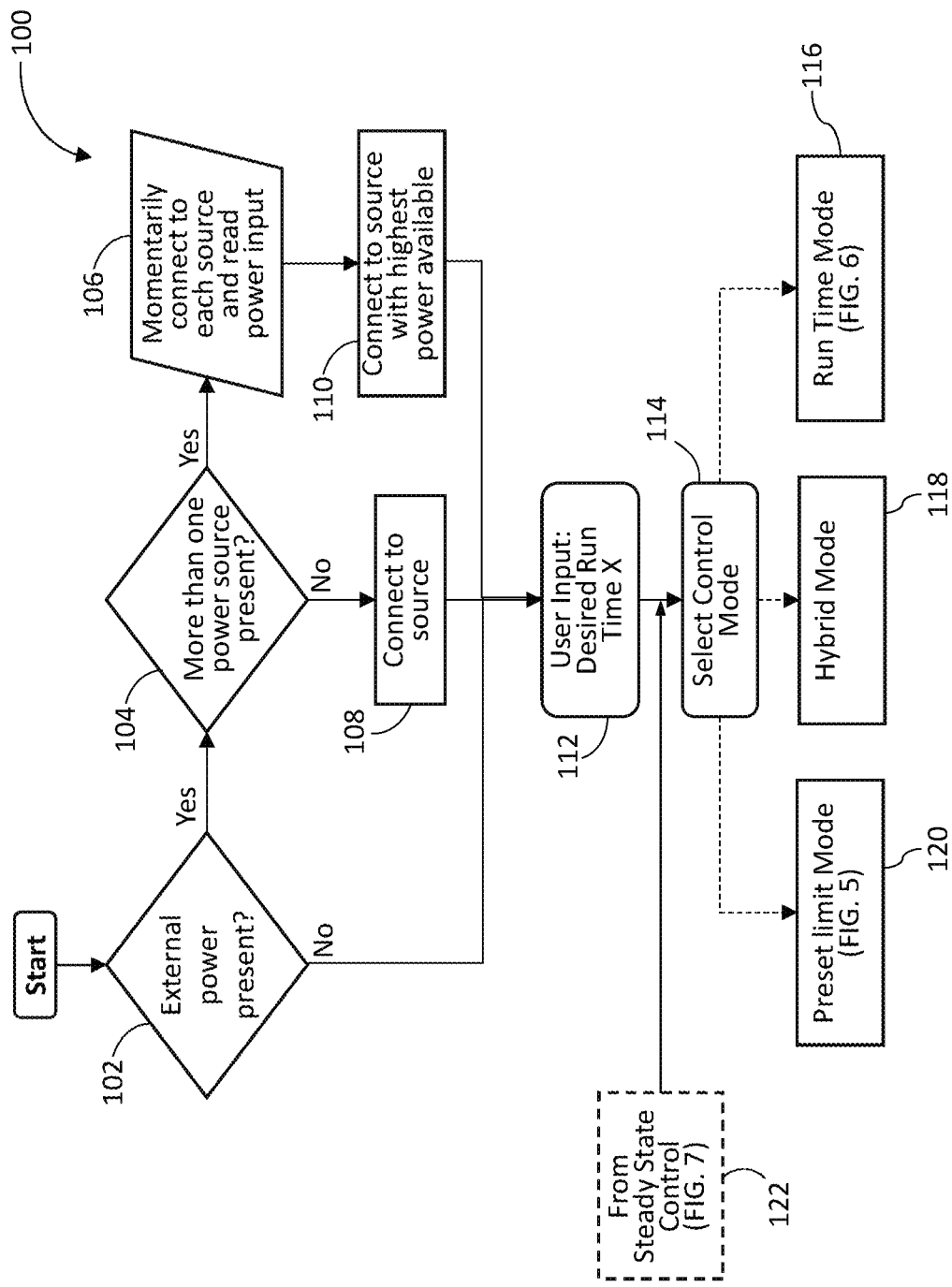
FIG. 4 is a flow diagram illustrating a portion of a decision logic including user selection of control modes according to an embodiment of the present disclosure.

An SP system decision logic in one embodiment of the present disclosure includes a user mode selection segment 100 as illustrated, for example, in FIG. 4. As shown therein, an initial determination is made as to the presence of external power 102. Where external power is detected, a further determination is made as to whether there is more than a single external power source 104. If more than one external power source is present, the system briefly connects to each source 106 to determined power input of each. In this case, the system then automatically connects to the detected source with the highest available power 110. When only a single source is detected, that single source is connected 108. User inputs include a desired Run Time X 112 and a Control Mode Selection 114. As later described, other user input may comprise specific circuit tiers # and target $SOC_{SP}$ values and times. Control Mode selection 114 allows a user to select between control modes such as Preset Limit Mode 120, shown in FIG. 5, Run Time Mode 116 shown in FIG. 6 and Hybrid Mode 118 (described further below). System process control may also be configured to return from steady state control scheme 122 (FIG. 7) at Control Mode selection 114 to permit a new mode selection. In some embodiments, user mode selection segment logic 100 may be provided as a user selection logic device including memory containing instructions for executing user selection logic segment 100.

Figure 5:
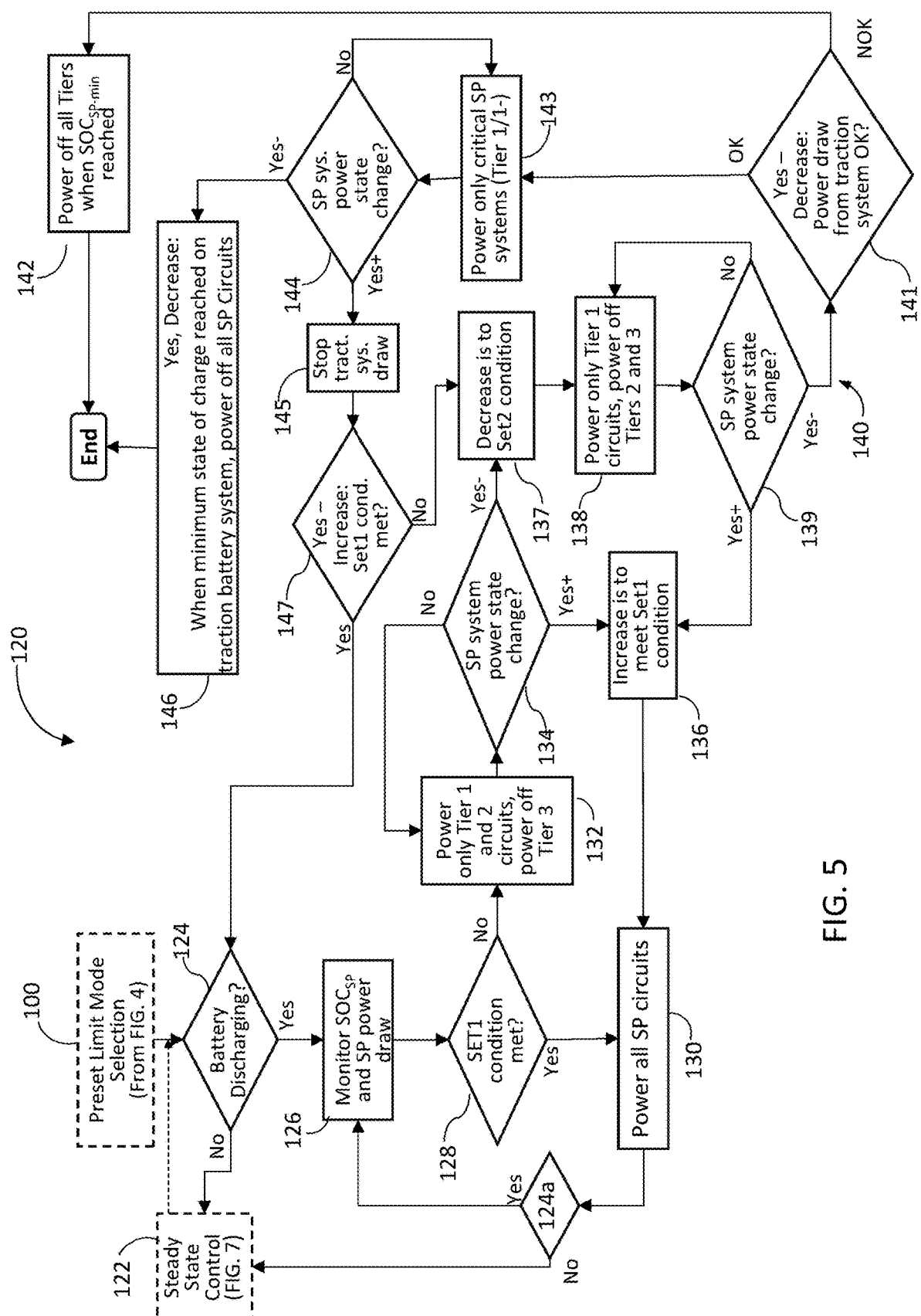
FIG. 5 is a flow diagram illustrating another portion of a decision logic including an example of a preset limit control scheme according to an embodiment of the present disclosure.
Figure 7:
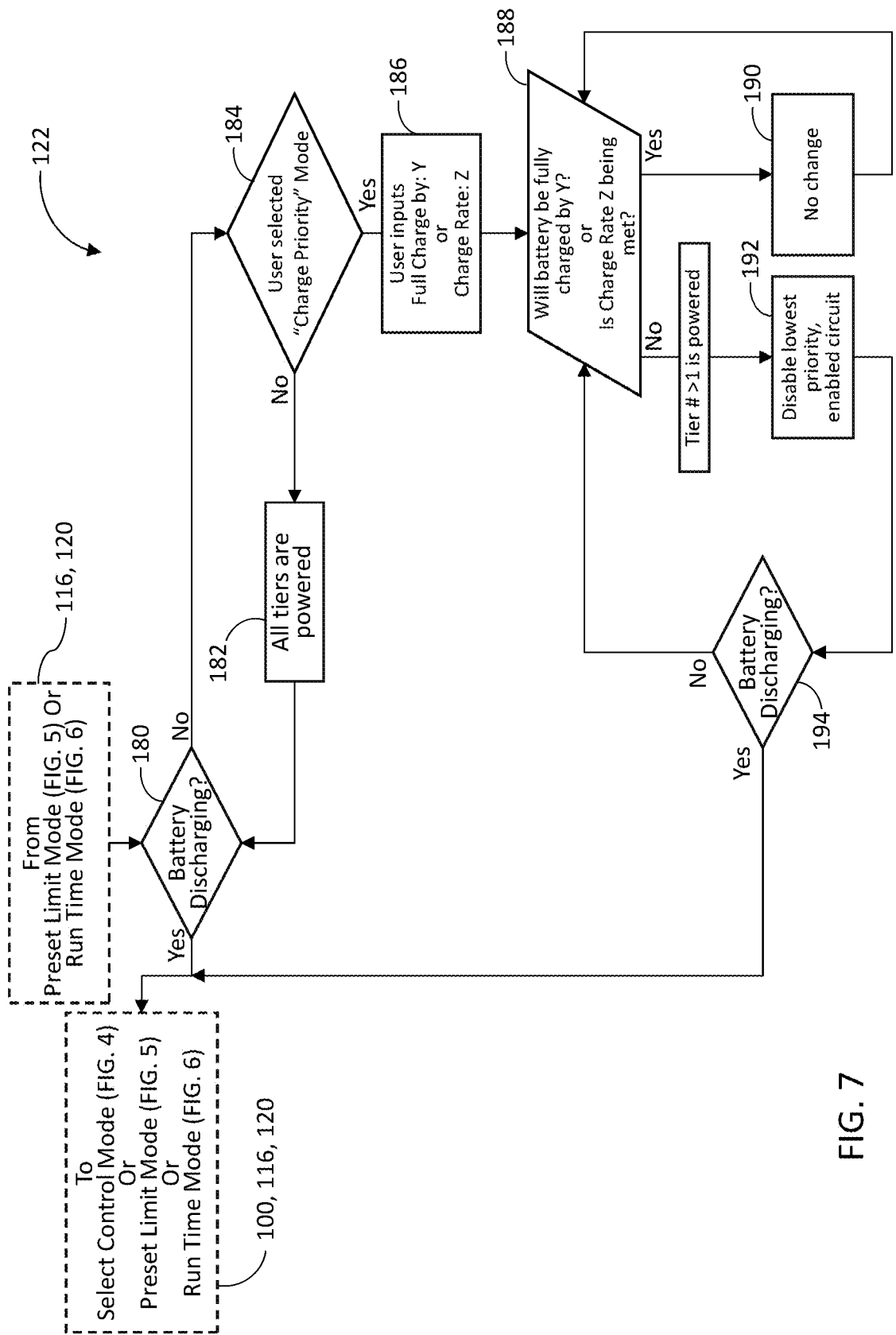
FIG. 7 is a flow diagram illustrating another portion of a decision logic including an example of a steady state control scheme according to an embodiment of the present disclosure.

FIG. 5 illustrates an example of the Preset Limit Control Mode 120 according to an embodiment of the present disclosure. After user selection of the Preset Limit Control Mode 120 in logic segment 100 (or when the system is configured to automatically enter the Preset Limit Control Mode), an initial determination 124 is made as to whether the SP battery 56 is discharging. If not discharging, process control is transferred to a steady state control scheme 122 such as shown in FIG. 7. When the SP battery 56 is determined to be discharging, $SOC_{SP}$ and SP system current power draw is determined 126 by the SP controller 52. Next steps in the decision logic comprise a comparison of measure SP system charge parameters to an initial configurable pre-set limit(s) SET1 128. One illustrative example, SET1 initial pre-set limits may comprise $SOC_{SP}$ at 30% or a time to $SOC_{SP-min}$ less than three hours. In some embodiments, the $SOC_{SP-min}$ for the SP battery set in software is based on the choice of battery or desired minimum $SOC_{SP}$. Another option is to allow a manual or software-based override or initial set on the $SOC_{SP-min}$ in case a user with sufficient authority wishes to do so. Necessary credentials for an $SOC_{SP-min}$ reset can also be established through SP U/I 54. In a further alternative, SP system controller 52 may contain in memory default values (for example, factory settings) for each user-required user input for a specific system and logic configuration. Saved default values will simplify initial use of the system and ensure operation when a user is not available for prompted inputs.

Where measured parameters meet or exceed initial pre-set limits 128, power to all SP circuits is continued 130. SP system controller 52 continually monitors discharge state and can automatically revert to steady state control 122 whenever a non-discharging system state is detected. For illustration purposes, decision 124a is shown as a drawing example of such continuous monitoring between logic actions 126 and 130, however such continuous monitoring can occur at any point in the system logic as will be appreciated by persons of ordinary skill. The illustration of only two such decision points 124 and 124a are shown in FIG. 5 for the sake of clarity in the figure.

When measured parameters do not meet preset limits 128, the lowest circuit tier, for example Tier 3 in a three tier system, is cut off 132. Charging power parameters continue to be monitored and tested 134. When there is no change in power state, or the change falls within acceptable limits, power only the lowest priority tier remains off 132. When the charge state increases to meet the SET1 conditions 136, all SP circuits are again powered 130. However, when system power status continues to decrease, measured parameters are tested against a lower preset limit (SET2) 137. Continuing the previous example, in view of SET1 above, the second, lower preset limit (SET2) may be set as $SOC_{SP}$ less than 20% or time to $SOC_{SP-min}$ less than two hours. When the second, lower preset limit (SET2) is not met 137, a next lower priority Tier circuit is turned off 138. In the case of a three Tier system, with the SET1 and SET2 example parameters, this would be Tier 2, with now both Tier 3 and Tier 2 off. Discharge/Charge state of the SP power system continues to be monitored 139. Where there is a positive change in power state, if the SET1 conditions are met, 136, all circuits are again powered 130. If there is a negative change in SP system power state, the SP system controller 52 may prompt for power draw from the traction system 141. Where there is no change in power state, Tier 1 circuits continue to be powered 138.

The user may optionally configure pre-set limit logic 120 to include additional preset limits (SET3 . . . n) depending on factors such as specific applications, specific SP system devices and user needs, etc. In one example, at point 140, using U/I 54 (also 220 shown in FIG. 9 and discussed further below), the user may include a third, lowest preset limit (SET3). Each successive user set preset limit adds a decision point and possible logic loops as described above with respect to decision points 128 and 134. Note that a three preset limit model is presented only as an example. Any number of progressive preset limits may be employed. In this particular example, the third, lower preset limit (SET3) may be set as an $SOC_{SP}$ less than 20% or time to $SOC_{SP-min}$ of less than 1 hour. In the case of a third preset limit (SET3) at point 140, the prompt 141 to draw power from the traction battery 12 only occurs when that limit is not met.

Requests to draw power from vehicle traction battery 141 can be granted automatically via a default setting, or can be given by an onboard switch or software command, or can be given remotely via a wireless communication to user with sufficient authority. $SOC_{trac-min}$ for the vehicle traction system 20 can be the default minimum SOC specification by the vehicle OEM, or it can be a user set value through U/I 54, for example one that is established to preserve battery health or to reserve a minimum amount of energy for traction purposes. An override function for the vehicle $SOC_{trac-min}$ can also be implemented. Where request 141 to draw from traction battery 12 is denied, all SP system circuit tiers are powered off 142 when $SOC_{SP}$ reaches $SOC_{SP-min}$. If request 141 is approved, then DC-DC converter 62 is switched to deliver power 143 from traction battery 12 to SP battery 56 via power connection 76 (See FIG. 1). Once again, $SOC_{SP}$ is monitored 144 and traction system battery power to the SP system is terminated 145 if $SOC_{SP}$ increases 144. If the traction system minimum state of charge ($SOC_{trac-min}$) is reached, power draw from the traction system ceases and all SP system tiers are turned off 146.

When system power state increases at 144 such that power draw from the traction system ceases 145, further determination of system power state is made 147. In one option, power state is tested against the initial preset limit (SET1). Where the SET 1 parameters are met or exceeded, process control returns to charge state monitoring 124. Where power state has increased sufficiently to cease power draw from the traction system but does not meet SET1 requirements, system operating conditions for SET2, i.e., only Tier 1 powered 138 is initiated.

The system is preferably configured such that at any point where state of charge information is monitored, an additional determination 124 of battery discharge state is made. This is illustrated by example by 124A as mentioned above and the line connecting steps 124 and 147, but for the sake of clarity a similar line is not shown for every such possible decision point. Checking battery discharge state at every point of $SOC_{SP}$ determination allows the system to efficiently switch from battery discharge control mode to steady state control scheme 122 (FIG. 7) at any point in the decision logic. In some embodiments, preset limit control mode 120 may be provided as a preset limit logic device including memory containing instructions for executing run preset limit control mode 120.

Figure 6:
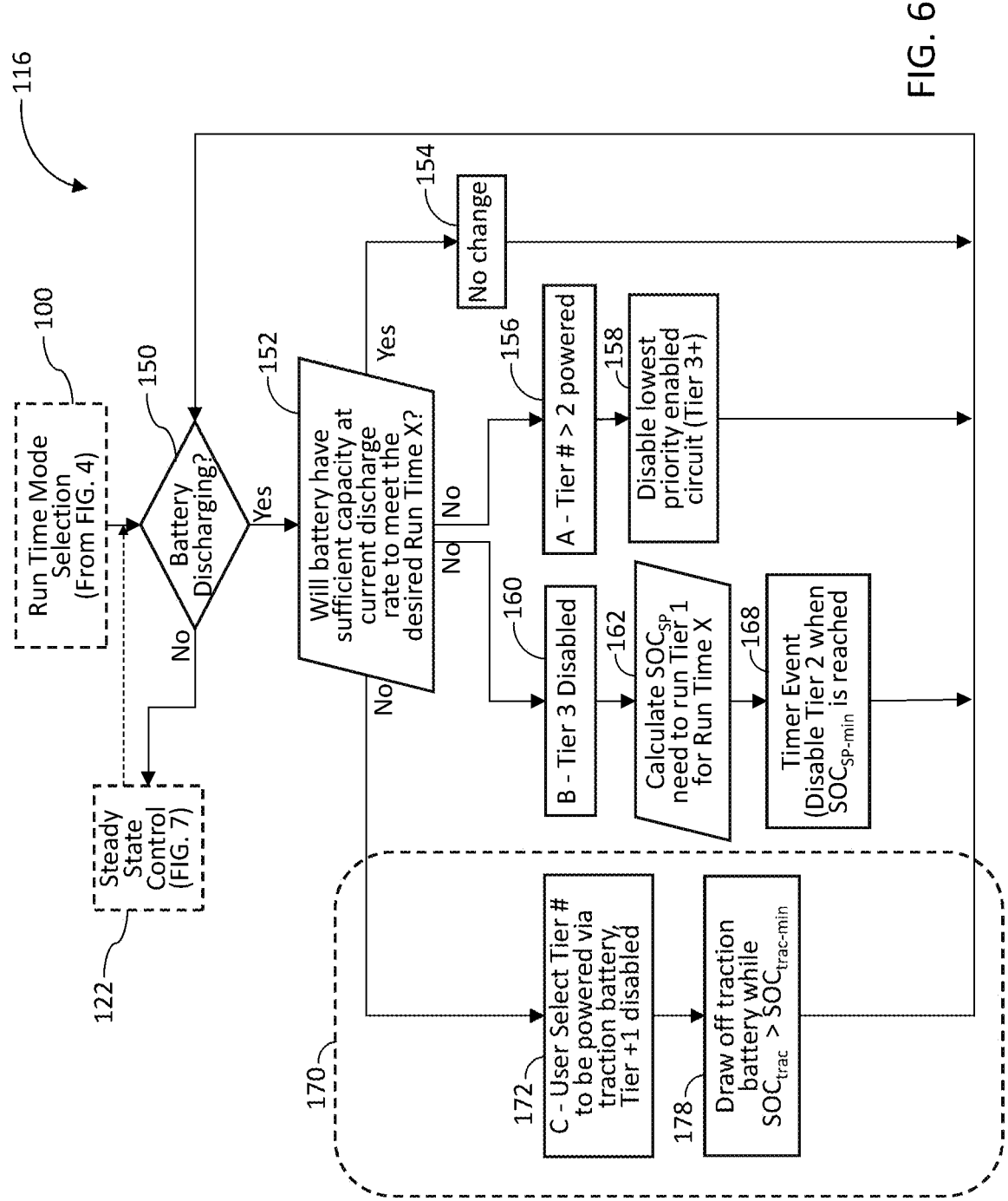
FIG. 6 is a flow diagram illustrating a further portion of a decision logic including an example of a user-selected run time control scheme according to an embodiment of the present disclosure.

FIG. 6 illustrates an example of the Run Time Control Mode 116 according to an embodiment of the present disclosure. After user selection of the Run Time Control Mode 116 in logic segment 100 (or when the system is configured to automatically enter the Run Time Control Mode), an initial determination 150 is again made as to whether the SP battery 56 is discharging. If not discharging, process control is transferred to a steady state control scheme 122 such as shown in FIG. 7. When the SP battery 56 is determined to be discharging, $SOC_{SP}$ and SP system current power draw is determined by the SP controller in order to assess 152 whether the SP battery 56 will have sufficient capacity at current discharge rate to meet the user input desired Run Time X. Where determination 152 is yes, no change 154 is made to SP system Tier usage. When determination 152 is no, then at least one of two conditions A and B are assessed with a third condition C being optionally assessed to provide optional power from the traction system.

Condition A comprises a tier number greater (i.e. lower priority) than Tier 2 being powered 156. When condition A exists, the lowest priority circuit, Tier 3 or higher, is disabled 158. Input Tier # greater than tier 2 is powered 156. Condition B comprises Tier 3 already disabled 160. In Condition B, SP control 52 calculates $SOC_{SP}$ required to run Tier 1 for input Run Time X 162. Timer event 168 then disables Tier 2 when the $SOC_{SP-min}$ is reached. Timer event 168 may comprise a timer loop in which the system repeats the $SOC_{SP-min}$ query at a set interval (which may be fixed in system firmware or software, or may be a user input). Optional logic sub-segment 170 allows power draw from traction battery 12 to power the SP system when set conditions are met. Optional logic sub-segment 170 may be included and user activated/deactivated, or may be omitted as appropriate for specific system designs. Sub-segment 170 requires Condition C in which all Tiers at lower priority (higher number designation) than a user selected Tier are already disabled 172. This condition ensures that traction battery 12 is not drawn down powering Tiers not considered essential by the user. When Condition C is met, selected SP system Tiers are powered via the traction battery so long as $SOC_{trac}$ is greater than a preset system $SOC_{trac-min}$ 178. After each of determination 152 being yes or no and any of conditions A-C 156, 160, 172, SP system control 52 makes continuous or periodic assessments of SP battery discharge state 150 and returns to determination 152 or to the steady state control scheme 122 (FIG. 7) as appropriate. In some embodiments, run time control mode 116 may be provided as a run time logic device including memory containing instructions for executing run time control mode 116.

Hybrid Control Mode 118 involves a mix of the control logics of Preset Limit Mode 120 and Run Time Mode 116 so as to provide greater control over SP system power states. For example, in a hybrid control mode, the SP system may calculate if all circuits can remain on to reach desired run time (T). If not, the SP system decides which circuits to turn off and when, taking into account user preferences and user set preset limits to reach desired run time (T) for at least higher priority circuits. If battery SOC reaches sufficient charge to turn on circuits that were shut off, then turn those back on as in steady state control scheme 122 discussed below.

In certain disclosed embodiments, steady state control scheme 122, shown in FIG. 7, is invoked whenever another System controller 52 determines that SP battery 56 is not in a discharge state. Steady state control scheme 122 thus effectively always begins with battery discharge state determination 180. When the battery state is determined to be discharging, control is removed from steady state control scheme 122 in favor of other modes disclosed hereinabove, via user selection or system defaults. If the batteries are not discharging, all circuits will be powered 182 unless a user selectable mode 184 is selected that will prioritize increasing the SP battery ($SOC_{SP}$ prioritize charging). If prioritizing $SOC_{SP}$ is determined most important, the user can input via U/I 54 when it is desired to have the battery system fully charged (by time Y) or a desired charge rate (Z) 186. In this mode, a calculation 188 by SP system control 52 will be used to determine if the user input parameters will be met. If so, no changes will be made 190. If the battery system is currently not charging at the desired rate or the full charge time will not be met 192, Tier N (where N>1) will be disabled, and N will be decremented until the charge rate is sufficient or N=1. Once again, battery discharging state can be continuously monitored, such as by "while loop" 194. In some embodiments, steady state control scheme 122 may be provided as a steady state logic device including memory containing instructions for executing control scheme 122.

Control logic segments and sub-segments shown in FIGS. 4-7 are merely exemplary illustrations of the embodiments disclosed herein. Using the teachings set forth in these figures and accompanying text, persons of ordinary skill may create many different variations within the scope of the present disclosure.

Figure 8:
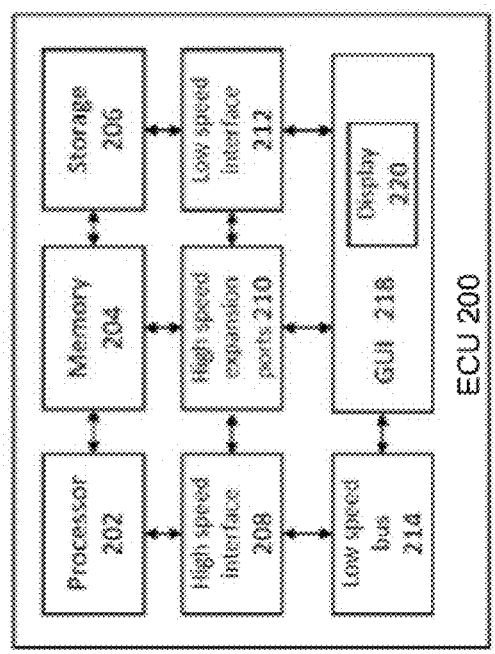
FIG. 8 is a block diagram illustrating a controller according to embodiments of the present disclosure.

In some embodiments, controllers, for example the SP System Controller 52 and EV control 14, may be executed as one or more electronic control units (ECU(s)) 200 as illustrated in FIG. 8. In this example, ECU 200 includes one or more processors 202, memory 204, storage device 206, high-speed interface 208 connecting to memory 204 and high-speed expansion ports 210, and a low speed interface 212 connecting to low speed bus 214 and storage device 206. Each of the components 202, 204, 206, 208, 210, and 212, are interconnected using various buses or other suitable connections as indicated in FIG. 5 by arrows connecting components. Processor 202 can process instructions for execution within ECU 200, including instructions stored in the memory 204 or on the storage device 206 to display graphical information via GUI 218 with display 220, or on an external user interface device, coupled to high speed interface 208. In other implementations, multiple processors and/or multiple buses may be used, as appropriate, along with multiple memories and types of memory. Also, multiple ECUs 200 may be connected, with each unit providing portions of the necessary operations (e.g., as a server bank, a group of blade servers, or a multi-processor system).

Memory 204 stores information within the ECU 200. In one implementation, the memory 204 is a computer-readable medium. In one implementation, the memory 204 is a volatile memory unit or units. In another implementation, the memory 204 is a non-volatile memory unit or units.

Storage device 206 is capable of providing mass storage for ECU 200, and may contain information such as the database of tile display information described hereinabove. In one implementation, storage device 206 is a computer-readable medium. In various different implementations, storage device 206 may be a floppy disk device, a hard disk device, an optical disk device, or a tape device, a flash memory or other similar solid state memory device, or an array of devices, including devices in a storage area network or other configurations. In one implementation, a computer program product is tangibly embodied in an information carrier. The computer program product contains instructions that, when executed, perform one or more methods, such as those described above. The information carrier is a computer- or machine-readable medium, such as the memory 204, the storage device 206, or memory on processor 202.

High speed controller 208 manages bandwidth-intensive operations for ECU 200, while low speed controller 212 manages lower bandwidth-intensive operations. Such allocation of duties is exemplary only. In one implementation, high-speed controller 208 is coupled to memory 204, display 220 (e.g., through a graphics processor or accelerator), and to high-speed expansion ports 210, which may accept various expansion cards (not shown). In the implementation, low-speed controller 212 is coupled to storage device 206 and low-speed bus 214. The low-speed bus, which may include various communication ports (e.g., USB, Bluetooth, Ethernet, wireless Ethernet) may be coupled to one or more input/output devices as part of GUI 218 or as a further external user interface, such as a keyboard, a pointing device, a scanner, or a networking device such as a switch or router, e.g., through a network adapter.

Figure 9:
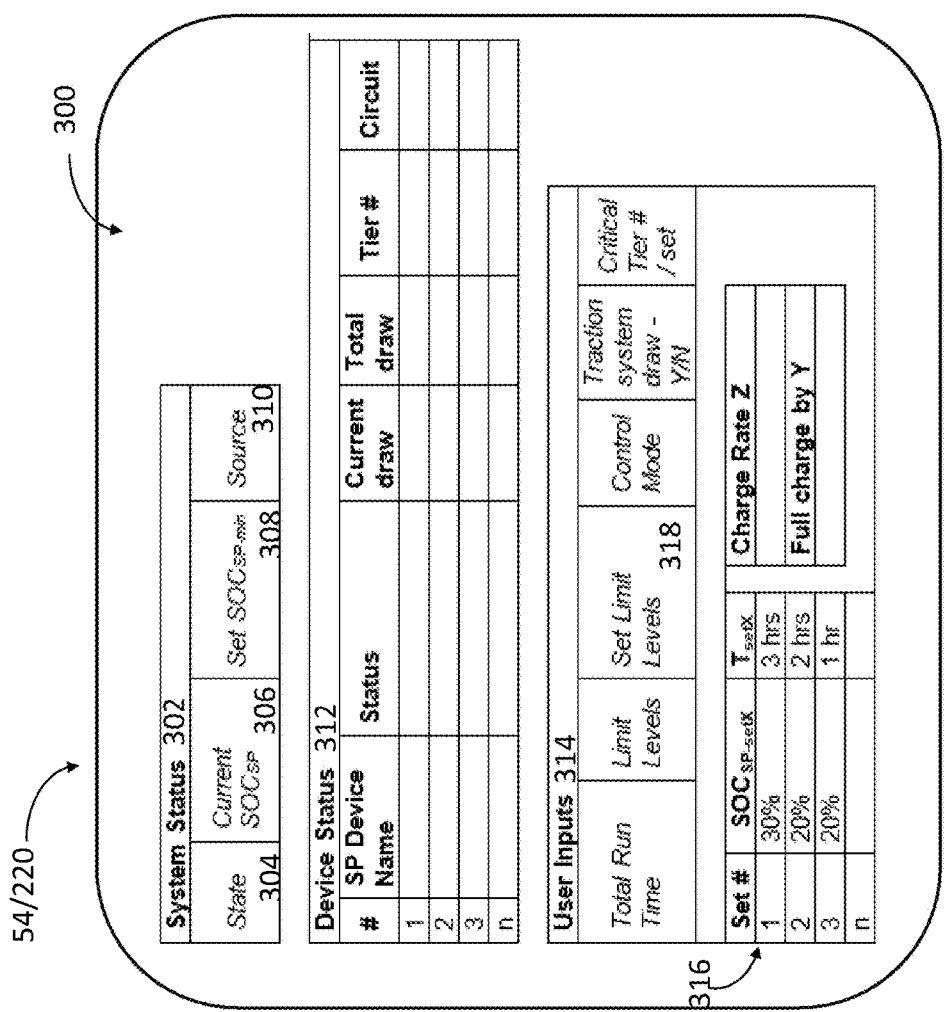
FIG. 9 illustrates an example of a user interface configured to display system status information and allow user inputs and changes to system parameters.

In one example, SP system U/I 54 can be provided as an interactive display 220 presenting various static and user modifiable data fields in one or more windows 300 as shown on FIG. 9. System status window 302 may display information such as SP system state 304 (on/off/charging/discharging, etc.), current SP system state of charge 306; allow user to set or modify a minimum state of charge for the SP system 308 and indicate source of power when in a charging state 310. Device status window 312 may provide an interactive list of SP devices installed in the SP power system 50. Exemplary fields may comprise SP Device name, device status (e.g. enabled/disabled/on/off), current power draw and total power draw for a use period, the Tier # and Circuits to which the SP device is assigned. Fields may be user-alterable where applicable, such as to change the Tier # to which a device is assigned or to change its status from disabled to enabled or from off to on. User inputs window 314 provides user-modifiable fields for input and change of the various user set parameters described herein, some examples of which are shown in FIG. 9. User inputs window 314 may also present an interactive list 316 of SET1 through SETn preset limits and allow new levels of preset limits to be added or existing limits deleted (e.g. set limit levels 318). Other parameters, such as Charge rate Z and Full charge by Y (see FIG. 7, 186), also may be set and changed via user inputs window 314.

Various implementations of the systems and techniques described here can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms "machine-readable medium" "computer-readable medium" refers to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

To provide for interaction with a user, the systems and techniques described here can be implemented on a computer having a display device (e.g., an LED, OLED or LCD display) for displaying information to the user and a keyboard and a pointing device (e.g., a mouse or a trackball) by which the user can provide input to the computer. Other kinds of devices can be used to provide for interaction with a user as well; for example, feedback provided to the user can be any form of sensory feedback (e.g., visual feedback, auditory feedback, or tactile feedback); and input from the user can be received in any form, including acoustic, speech, or tactile input.

The systems and techniques described here can be implemented in a computing system that includes a back end component (e.g., as a data server), or that includes a middleware component (e.g., an application server), or that includes a front end component (e.g., a client computer having a graphical user interface or a Web browser through which a user can interact with an implementation of the systems and techniques described here), or any combination of such back end, middleware, or front end components. The components of the system can be interconnected by any form or medium of wired or wireless digital data communication (e.g., a communication network). Examples of communication networks include a local area network ("LAN"), a wide area network ("WAN"), and the Internet.

The computing system can include clients and servers. A client and server are generally remote from each other and typically interact through a communication network. The relationship of client and server arises by virtue of computer programs running on the respective computers and having a client-server relationship to each other.

Further features, aspects and advantages of embodiments disclosed herein include system configuration as an "aftermarket" system that is a modularly expandable energy storage system (varying energy storage capacity based on customer requirements). Because accessory power requirements will vary based on the vehicle type and its specific use case (for example, there will be different types and quantities of special purpose devices, and those special purpose devices may be used differently in various applications, the energy storage capacity of the disclosed systems and methods can be readily varied to suit needs. This may also include a modular SP battery that can be implemented in various storage capacities. For example, by using a 2 kWh capacity battery cell that provides the desired voltage (12, 24, 48, etc.), an SP battery with different storage capacities based on the needs of the applications can be achieved by installing different numbers of battery cells. Additionally, installation of extra battery cells (i.e., redundant) guards against failure of one or more connections to still provide the required voltage.

A modularly expandable configuration as disclosed herein also provides an ability to create different capacity energy storage systems, —allows for redundancy of batteries and their connections to provide system resilience and fault tolerance, and provides cost advantages since customers can configure their vehicles based on their energy storage needs and do not have to acquire and maintain batteries they do not need. The redundant or fault tolerant battery configuration can be any of: n (where is the required number of batteries to support the use case application), wherein:

n only=no fault tolerance
n+1=some fault tolerance
2n=full redundancy

As with the battery redundancy and fault tolerance (described above), all related power buses, wiring, connections, electronics, etc. can also be configured to be redundant and fault tolerant. For example, instead of daisy chaining battery connections together, the batteries may all be individually connected to dual power distribution cables or power buses. In this configuration, the failure of one battery or its interconnection to the system, will not cause the entire energy storage system to become unavailable. Similarly, parallel connections and circuits can also be implemented throughout the balance of disclosed systems to provide fault tolerance and system resiliency. This can include connections, wiring, electronics, sensors, and even the accessories themselves.

System resilience is achieved by enhancing the system's ability to continue functioning or to recover when a fault or interruption occurs through configurations and methods described herein. For example, system resiliency is achieved by building in the redundant or n+1 configurations described above. In addition, the system control software can also automatically switch to another operating mode when a fault occurs to continue the systems operations. An example of this is when the vehicle is connected to both a J1772 charger and a 220 VAC shore power connection and one of those drops out. In some situations, such as where batteries are individually connected to a power bus or cable, when one battery stops working, no special logic or control may be required to have the other batteries continue to provide power. However in some instances, it may be required to have a controller or control logic to have the system switch into an alternate operating mode or to switch to a different component.

Disclosed systems and methods increase user flexibility to select special purpose devices and to prioritize them (vs as built-OEM vehicles). A typical OEM vehicle may come with an automatic load shedding sequence whereby conventional accessories or vehicle functions are limited or disabled based on the amount of battery energy or engine energy that's made available. These conventional EV systems are hard coded or embedded in the vehicle's operations and the user does not typically have access to reorder or reprioritize those based on their specific application. In contrast, in disclosed systems and methods, multiple circuits are available and each of those circuits has a priority in terms of receiving power. The circuits are flexible in what special purpose devices are connected to each of them. This allows the user to decide what their priority devices are and what circuit to connect them too. This makes the disclosed systems and methods highly configurable, and also adaptable to the user operation priorities.

The modularity and overall configuration of disclosed systems and methods also allows connection with and power draw from the vehicle traction system with minimal connections into and disruption of OEM traction system components and control. In some embodiments there may be no changes whatsoever in OEM EV control systems or logic.

This can present significant practical advantages for the SPEV owner and operator by minimizing possibilities of OEM warranty issues. Typically vehicle manufactures only warranty their own products and workmanship. It is therefore beneficial to leave much of the vehicle's original wiring and components unmodified so that dealerships and manufactures cannot use the modifications as a means of voiding a warranty. Single point or dual point integration into the OEM system as shown in FIG. 1 is therefore a significant improvement and advantages over prior systems.

In one alternative embodiment, a special purpose (SP) power system for an electric vehicle (EV) may comprise plural SP AC load circuits, each AC load circuit containing at least one AC powered SP device, plural SP DC load circuits, each DC load circuit containing at least one DC powered SP device, an SP system battery configured to deliver power to said SP load circuits, a power connection between an SP system battery and an EV traction battery, an SP control system comprising a user selection logic device, a preset limit logic device, a run time logic device, and a steady state logic device, and a data link between traction SP control system and an EV controller configured to at least communicate EV state of charge information to the SP control system. In one such implementation the SP control system comprises one or more processors and memory configured as the logic devices.

Further aspects, advantages and features of embodiments of the present disclosure are included in the following numbered paragraphs setting forth claim elements, claim descriptions and inventions in addition to those set forth in the appended claims.

A special purpose electric vehicle (SPEV), comprising:
a traction system, comprising—
  a traction battery;
  at least one traction motor powered primarily by the traction battery to provide propulsion for the vehicle;
  an auxiliary battery;
  auxiliary devices powered primarily by the auxiliary battery;
  a traction control system configured to at least (i) control power delivered to the traction motor from the traction battery, (ii) control power delivered to auxiliary devices by the auxiliary battery, and (iii) manage charge and discharge of the traction and auxiliary batteries; and
a special purpose (SP) power system, comprising—
  plural SP AC load circuits, each AC load circuit containing at least one AC powered SP device;
  plural SP DC load circuits, each DC load circuit containing at least one DC powered SP device;
  an SP system battery configured to deliver power to said SP load circuits;
  a power connection between the traction battery and SP battery;
  an SP control system configured to at least (i) control power delivered to the plural AC and DC load circuits from the SP system battery, (ii) manage charge and discharge of the SP system battery, and (iii) control power draw from the traction battery to SP power system based on criteria set in the SP control system; and
  a data link between traction control system and SP control system configured to at least communicate traction system state of charge information to the SP control system;
  wherein the SP control system comprises one or more processors, non-transitory storage devices, user interfaces, and stored instructions that when executed by said one or more processors cause the SP control system to—
    receive user inputs comprising SP load circuit priority, desired SP system run time;
    set SP load circuit priority in accordance with the user input or in the absence of user input based on preset SP device information received by the one or more processors;
    disconnect SP load circuits from the SP system battery in accordance with the SP load circuit priority based on one or both of (i) maintaining power to highest priority SP load circuits for the desired run time, and (ii) comparison of the SP system battery state of charge ($SOC_{SP}$) to an $SOC_{SP}$ minimum, and
    initiate power draw from the traction battery to the SP system battery in response to measured SP power system parameters, and terminate power draw from the traction battery based on measured traction battery state of charge.

The vehicle as described above, wherein the SP control system is further configured to:
monitor SP system battery state parameters including current charge level, capacity, temperature, current and charge/discharge state; and
determine SP system battery state of charge ($SOC_{SP}$) based on one or more said state parameters.

The vehicle as described above, wherein stored instructions further comprise instructions to:
disable lowest priority SP load circuits when $SOC_{SP}$ and said battery state parameters meet a first preset limit condition;
disable second lowest priority SP load circuits when $SOC_{SP}$ and said battery state parameters meet a second preset limit condition;
present a user prompt to permit power draw by the SP power system from the traction battery when $SOC_{SP}$ and said battery state parameters meet a traction power draw preset limit condition; and
if traction system power draw is not permitted, disable all SP load circuits, or if traction system power draw is permitted, power only highest priority SP load circuits until traction system SOC as reported to the SP control system by the traction control system reaches a traction system minimum SOC;
enable all SP load circuits when $SOC_{SP}$ and said battery state parameters exceed the first preset limit condition; and
enable the second lowest priority SP load circuits when $SOC_{SP}$ and said battery state parameters exceed the second preset limit condition but do not exceed the first preset limit condition.

The vehicle as described above, wherein the stored instructions further comprise instructions to:
receive a desired run time;
repeatedly determine based on the $SOC_{SP}$ and monitored battery state parameters whether the SP system battery has sufficient capacity to satisfy the desired run time with all currently enabled SP load circuits;
when determined to have sufficient capacity, maintain all currently enabled SP load circuits in an enabled state;
when determined not to have sufficient capacity, disable lowest priority SP load circuits out of the currently enabled SP load circuits;

when determined not to have sufficient capacity and only highest priority SP load circuits are enabled, draw power from the traction battery to power said highest priority SP load circuits;

discontinue said power draw from the traction battery when traction system SOC as reported to the SP control system by the traction control system reaches a traction system minimum SOC;

present in the SP system user interface configured for user entry of SP load circuit priorities; and said SP load circuits are enabled and disabled in accordance with user entered priorities.

The vehicle as described above, wherein the stored instructions further comprise instructions to:

when SP system battery state is determined to be not discharging, enable all SP load circuits until a charge priority mode is initiated or the SP system battery is in a discharging state;

when a charge priority mode is initiated, prompt the user to input at least one of a time to full charge of the SP system battery or a specified charge rate;

determine whether the input charge time or charge rate is satisfied based on current $SOC_{SP}$ and monitored battery state parameters;

if input charge time or charge rate is satisfied, maintain all currently enabled SP load circuits;

if input charge time or charge rate is not satisfied, disable lowest priority SP load circuits in reverse priority sequence until satisfied; and when SP system battery charge/discharge state is determined to be discharging, initiate an SP load circuit load shedding control mode.

The vehicle as described above, wherein:

the SP system battery is connected to the traction battery through a dedicated DC-DC converter under control of the SP system controller;

the SP power system further comprises a power to grid connection via a power converter under control of the SP system controller;

each SP AC load is connected to plural AC circuits via a control node;

each SP DC load is connected to plural DC circuits via a control node;

the SP system battery is connected to all said AC and DC circuits via a control node for each circuit;

an external power supply connection is connected to all said AC and DC circuits via a control node for each circuit;

the traction battery is connected to all said AC and DC circuits via a control node for each circuit, whereby any connected AC or DC circuit can provide connections for respective AC or DC SP loads to power sources; and the traction auxiliary battery is connected to all said AC and DC circuits via a control node for each circuit.

The vehicle as described above, wherein each said control node comprises a circuit breaker controlled by the SP system controller configured to provide circuit protection and on/off switching in response to instructions from the SP system controller.

The vehicle as described above, wherein:

the SP AC loads comprise one or more of laptop, computer monitor, server power supply, air conditioning unit, and wide screen television; and the SP DC loads comprise one or more of perimeter scene lights, LED lighting, refrigeration unit, and communication radios.

A computer-implemented method of managing power to special purpose (SP) devices in an SP power system of an electric vehicle (EV), wherein said SP devices comprise AC and DC loads configured in SP AC load circuits and SP DC load circuits, the method comprising:

monitoring battery state parameters of an SP system battery including current charge level, capacity, temperature, current and charge/discharge state;

determining SP system battery state of charge ($SOC_{SP}$) based on one or more of said battery state parameters;

receiving user inputs comprising SP load circuit priority and desired SP system run time;

setting SP load circuit priority in accordance with the user input or, in the absence of user input, based on preset SP device information stored in a memory;

disconnecting SP load circuits from the SP system battery in accordance with the SP load circuit priority based on one or both of (i) maintaining power to highest priority SP load circuits for the desired run time, and (ii) comparison of the SP system battery state of charge ($SOC_{SP}$) to an $SOC_{SP}$ minimum;

initiating power draw from an EV traction battery to the SP system battery in response to measured SP power system parameters; and terminating power draw from the EV traction battery based on measured traction battery state of charge.

The method as described above, further comprising:

detecting available external power inputs to the SP power system;

when multiple available external power inputs are detected, transiently connecting to each available external power input and determining power supply parameters for each available external power input; and connecting the SP system battery to the available external power input with highest available power input capacity.

The method as described above, further comprising:

disabling lowest priority SP load circuits when $SOC_{SP}$ and said battery state parameters meet a first preset limit condition; and disabling second lowest priority SP load circuits when $SOC_{SP}$ and said battery state parameters meet a second preset limit condition.

The method as described above, further comprising:

presenting a user prompt in a user interface to permit user selection of power draw by the SP power system from the traction battery when $SOC_{SP}$ and said battery state parameters meet a traction power draw preset limit condition;

if traction system power draw is not selected, disabling all SP load circuits; and if traction system power draw is selected, powering only highest priority SP load circuits until the traction battery SOC as reported by an EV controller reaches a traction battery minimum SOC.

The method as described above, further comprising disabling third lowest priority SP load circuits when $SOC_{SP}$ and said battery state parameters meet a third preset limit condition.

The method as described above, further comprising:

enable all SP load circuits when $SOC_{SP}$ and said battery state parameters exceed the first preset limit condition; and enable the second lowest priority SP load circuits when $SOC_{SP}$ and said battery state parameters exceed the second preset limit condition but do not exceed the first preset limit condition.

The method as described above, further comprising:
receiving a desired run time;
repeatedly determining based on the $SOC_{SP}$ and monitored battery state parameters whether the SP system battery has sufficient capacity to satisfy the desired run time with all currently enabled SP load circuits;
when determined to have sufficient capacity, maintaining all currently enabled SP load circuits in an enabled state; and
when determined not to have sufficient capacity, disabling lowest priority SP load circuits out of the currently enabled SP load circuits.

The method as described above, further comprising:
when determined not to have sufficient capacity and only highest priority SP load circuits are enabled, drawing power from the traction battery to power said highest priority SP load circuits; and
discontinuing said power draw from the traction battery when traction battery SOC as reported by EV controller reaches a traction battery minimum SOC.

The method as described above, further comprising:
configuring a user interface for user entry of SP load circuit priorities; and
enabling and disabling SP load circuits in accordance with user entered priorities.

The method as described above, further comprising:
when SP system battery state is determined to be not discharging, enabling all SP load circuits until a charge priority mode is initiated or the SP system battery is in a discharging state;
when a charge priority mode is initiated, prompting a user through a user interface to input at least one of a time to full charge of the SP system battery or a specified charge rate;
determining whether the input charge time or charge rate is satisfied based on current $SOC_{SP}$ and monitored battery state parameters;
if input charge time or charge rate is satisfied maintaining all currently enabled SP load circuits; and
if input charge time or charge rate is not satisfied, disabling lowest priority SP load circuits in reverse priority sequence until satisfied.

A computer program product for managing power to special purpose (SP) devices in an SP power system of an electric vehicle (EV), wherein said SP devices comprise AC and DC loads configured in SP AC load circuits and SP DC load circuits, the computer program product comprising a computer readable storage medium having program instructions embodied therewith, the program instructions executable by one or more processors to cause said one or more processors to perform a method comprising:
monitoring battery state parameters of an SP system battery including current charge level, capacity, temperature, current and charge/discharge state;
determining SP system battery state of charge ($SOC_{SP}$) based on one or more of said battery state parameters;
receiving user inputs comprising SP load circuit priority and desired SP system run time;
setting SP load circuit priority in accordance with the user input or, in the absence of user input, based on preset SP device information stored in a memory;
disconnecting SP load circuits from the SP system battery in accordance with the SP load circuit priority based on one or both of (i) maintaining power to highest priority SP load circuits for the desired run time, and (ii) comparison of the SP system battery state of charge ($SOC_{SP}$) to an $SOC_{SP}$ minimum;
initiating power draw from an EV traction battery to the SP system battery in response to measured SP power system parameters; and
terminating power draw from the EV traction battery based on measured traction battery state of charge.

The computer program product as described above, wherein the instructions embodied with the computer readable medium comprise instructions to cause the one or more processors to perform a method further comprising:
detecting available external power inputs to the SP power system;
when multiple available external power inputs are detected, transiently connecting to each available external power input and determining power supply parameters for each available external power input; and
connecting the SP system battery to the available external power input with highest available power input capacity.

The computer program product as described above, wherein the instructions embodied with the computer readable medium comprise instructions to cause the one or more processors to perform a method further comprising:
disabling lowest priority SP load circuits when SOCSP and said battery state parameters meet a first preset limit condition; and
disabling second lowest priority SP load circuits when SOCSP and said battery state parameters meet a second preset limit condition.

The computer program product as described above, wherein the instructions embodied with the computer readable medium comprise instructions to cause the one or more processors to perform a method further comprising:
presenting a user prompt in a user interface to permit user selection of power draw by the SP power system from the traction battery when SOCSP and said battery state parameters meet a traction power draw preset limit condition;
if traction system power draw is not selected, disabling all SP load circuits; and
if traction system power draw is selected, powering only highest priority SP load circuits until the traction battery SOC as reported by an EV controller reaches a traction battery minimum SOC.

The computer program product as described above, wherein the instructions embodied with the computer readable medium comprise instructions to cause the one or more processors to perform a method further comprising disabling third lowest priority SP load circuits when SOCSP and said battery state parameters meet a third preset limit condition.

The computer program product as described above, wherein the instructions embodied with the computer readable medium comprise instructions to cause the one or more processors to perform a method further comprising:
enable all SP load circuits when $SOC_{SP}$ and said battery state parameters exceed the first preset limit condition; and
enable the second lowest priority SP load circuits when $SOC_{SP}$ and said battery state parameters exceed the second preset limit condition but do not exceed the first preset limit condition.

The computer program product as described above, wherein the instructions embodied with the computer readable medium comprise instructions to cause the one or more processors to perform a method further comprising:
receiving a desired run time;
repeatedly determining based on the $SOC_{SP}$ and monitored battery state parameters whether the SP system battery has sufficient capacity to satisfy the desired run time with all currently enabled SP load circuits;

when determined to have sufficient capacity, maintaining all currently enabled SP load circuits in an enabled state; and when determined not to have sufficient capacity, disabling lowest priority SP load circuits out of the currently enabled SP load circuits.

The computer program product as described above, wherein the instructions embodied with the computer readable medium comprise instructions to cause the one or more processors to perform a method further comprising:

when determined not to have sufficient capacity and only highest priority SP load circuits are enabled, drawing power from the traction battery to power said highest priority SP load circuits; and discontinuing said power draw from the traction battery when traction battery SOC as reported by EV controller reaches a traction battery minimum SOC.

The computer program product as described above, wherein the instructions embodied with the computer readable medium comprise instructions to cause the one or more processors to perform a method further comprising:

configuring a user interface for user entry of SP load circuit priorities; and enabling and disabling SP load circuits in accordance with user entered priorities.

The computer program product as described above, wherein the instructions embodied with the computer readable medium comprise instructions to cause the one or more processors to perform a method further comprising:

when SP system battery state is determined to be not discharging, enabling all SP load circuits until a charge priority mode is initiated or the SP system battery is in a discharging state;

when a charge priority mode is initiated, prompting a user through a user interface to input at least one of a time to full charge of the SP system battery or a specified charge rate;

determining whether the input charge time or charge rate is satisfied based on current $SOC_{SP}$ and monitored battery state parameters;

if input charge time or charge rate is satisfied maintaining all currently enabled SP load circuits; and if input charge time or charge rate is not satisfied, disabling lowest priority SP load circuits in reverse priority sequence until satisfied.

The foregoing has been a detailed description of illustrative embodiments of the disclosure. It is noted that in the present specification and claims appended hereto, conjunctive language such as is used in the phrases "at least one of X, Y, and Z" and "one or more of X, Y, and Z," unless specifically stated or indicated otherwise, shall be taken to mean that each item in the conjunctive list can be present in any number exclusive of every other item in the list or in any number in combination with any or all other item(s) in the conjunctive list, each of which may also be present in any number. Applying this general rule, the conjunctive phrases in the foregoing examples in which the conjunctive list consists of X, Y, and Z shall each encompass: one or more of X; one or more of Y; one or more of Z; one or more of X and one or more of Y; one or more of Y and one or more of Z; one or more of X and one or more of Z; and one or more of X, one or more of Y and one or more of Z.

Various modifications and additions can be made without departing from the spirit and scope of this disclosure. Features of each of the various embodiments described above may be combined with features of other described embodiments as appropriate in order to provide a multiplicity of feature combinations in associated new embodiments. Furthermore, while the foregoing describes a number of separate embodiments, what has been described herein is merely illustrative of the application of the principles of the present disclosure. Additionally, although particular methods herein may be illustrated and/or described as being performed in a specific order, the ordering is highly variable within ordinary skill to achieve aspects of the present disclosure. Accordingly, this description is meant to be taken only by way of example, and not to otherwise limit the scope of this disclosure or of the inventions as set forth in following claims.

What is claimed is:

1. A special purpose (SP) power system for an electric vehicle (EV) having a traction battery, at least one traction motor powered by the traction battery, a low voltage auxiliary battery powering EV auxiliary devices and an EV controller configured to control power, charge and discharge of the traction battery and low voltage auxiliary battery, said special purpose (SP) power system, comprising: plural SP AC load circuits, each AC load circuit containing at least one AC powered SP device; plural SP DC load circuits, each DC load circuit containing at least one DC powered SP device; an SP system battery configured to deliver power to said SP load circuits; a power connection between the traction battery and SP battery; an SP control system configured to at least monitor SP system battery state parameters including current charge level, capacity, temperature, current and charge/discharge state and determine SP system battery state of charge (SOCsP) based on one or more said state parameters; and a data link between traction control system and SP control system configured to at least communicate traction system state of charge information to the SP control system; wherein the SP control system comprises one or more processors, non-transitory storage devices, user interfaces, and stored instructions that when executed by said one or more processors cause the SP control system to—control power delivered to the plural AC and DC load circuits from the SP system battery; manage charge and discharge of the SP system battery; and control power draw from the traction battery to SP power system based on criteria set in the SP control system;

wherein stored instructions further comprise instructions to: receive user inputs comprising SP load circuit priority, desired SP system run time; set SP load circuit priority in accordance with the user input or in the absence of user input based on preset SP device information received by the one or more processors; disconnect SP load circuits from the SP system battery in accordance with the SP load circuit priority based on one or both of (i) maintaining power to highest priority SP load circuits for the desired run time, and (ii) comparison of the SP system battery state of charge (SOCsP) to an SOCsp minimum, and initiate power draw from the traction battery to the SP system battery in response to measured SP power system parameters, and terminate power draw from the traction battery based on measured traction battery state of charge.

2. The system of claim 1, wherein stored instructions further comprise instructions to: detect available external power inputs to the SP power system; where multiple available external power inputs are detected, transiently connect to each available external power input to detect power supply parameters for each available external power input; connect the SP system battery to the available external power input with highest available power input capacity.

3. The system of claim 1, wherein stored instructions further comprise instructions to: disable lowest priority SP load circuits when SOCsp and said battery state parameters meet a first preset limit condition; and disable second lowest priority SP load circuits when SOCsp and said battery state parameters meet a second preset limit condition.

4. The system of claim 3, wherein stored instructions further comprise instructions: present a user prompt to permit power draw by the SP power system from the traction battery when SOCsp and said battery state parameters meet a traction power draw preset limit condition; and if traction system power draw is not permitted, disable all SP load circuits, or if traction system power draw is permitted, power only highest priority SP load circuits until traction system SOC as reported to the SP control system by the traction control system reaches a traction system minimum SOC.

5. The system of claim 3, wherein the stored instructions further comprise instructions to disable third lowest priority SP load circuits when SOCsp and said battery state parameters meet a third preset limit condition.

6. The system of claim 3, wherein the stored instructions further comprise instructions to: enable all SP load circuits when SOCsp and said battery state parameters exceed the first preset limit condition; and enable the second lowest priority SP load circuits when SOCsp and said battery state parameters exceed the second preset limit condition but do not exceed the first preset limit condition.

7. The system of claim 1, wherein the stored instructions further comprise instructions to: receive a desired run time; repeatedly determine based on the SOCsp and monitored battery state parameters whether the SP system battery has sufficient capacity to satisfy the desired run time with all currently enabled SP load circuits; when determined to have sufficient capacity, maintain all currently enabled SP load circuits in an enabled state; and when determined not to have sufficient capacity, disable lowest priority SP load circuits out of the currently enabled SP load circuits.

8. The system of claim 7, wherein the stored instructions further comprise instructions to: when determined not to have sufficient capacity and only highest priority SP load circuits are enabled, draw power from the traction battery to power said highest priority SP load circuits; and discontinue said power draw from the traction battery when traction system SOC as reported to the SP control system by the traction control system reaches a traction system minimum SOC.

9. The system of claim 8, wherein the stored instructions further comprise instructions to: present in the SP system user interface configured for user entry of SP load circuit priorities; and said SP load circuits are enabled and disabled in accordance with user entered priorities.

10. The system of claim 1, wherein the stored instructions further comprise instructions to: when SP system battery state is determined to be not discharging, enable all SP load circuits until a charge priority mode is initiated or the SP system battery is in a discharging state; when a charge priority mode is initiated, prompt the user to input at least one of a time to full charge of the SP system battery or a specified charge rate; determine whether the input charge time or charge rate is satisfied based on current SOCsp and monitored battery state parameters; if input charge time or charge rate is satisfied maintain all currently enabled SP load circuits; and if input charge time or charge rate is not satisfied, disable lowest priority SP load circuits in reverse priority sequence until satisfied.

11. The system of claim 10, wherein the stored instructions further comprise instructions to: when SP system battery charge/discharge state is determined to be discharging, initiate an SP load circuit load shedding control mode.

12. The system of claim 1, wherein the SP system battery is connected to the traction battery through a dedicated DC-DC converter under control of the SP system controller.

13. The vehicle of claim 11, wherein the SP power system further comprises a power to grid connection via a power converter under control of the SP system controller.

14. The system of claim 1, wherein: the SP system battery comprises plural interconnected batteries; and the SP control system is further configured to detect the total capacity of available batteries of said plural interconnected batteries and to determine SOCsP, based on the detected available capacity.

15. The system of claim 1, wherein: each SP AC load is connected to plural AC circuits via a control node; each SP DC load is connected to plural DC circuits via a control node; the SP system battery is connected to all said AC and DC circuits via a control node for each circuit; an external power supply connection is connected to all said AC and DC circuits via a control node for each circuit; and the traction battery is connected to all said AC and DC circuits via a control node for each circuit, whereby any connected AC or DC circuit can provide connections for respective AC or DC SP loads to power sources.

16. The system of claim 15, wherein the traction auxiliary battery is connected to all said AC and DC circuits via a control node for each circuit.

17. The system of claim 15, wherein each said control node comprises a circuit breaker controlled by the SP system controller configured to provide circuit protection and on/off switching in response to instructions from the SP system controller.

18. The system of claim 1, wherein the SP AC loads comprise one or more of laptop, computer monitor, server power supply, air conditioning unit, and wide screen television.

19. The system of claim 1, wherein the SP DC loads comprise two or more of perimeter scene lights, LED lighting, refrigeration unit, and communication radios.

* * * * *